(12) United States Patent
Bhattad et al.

(10) Patent No.: US 11,375,539 B2
(45) Date of Patent: Jun. 28, 2022

(54) LISTEN-BEFORE-TALK FOR UPLINK TRANSMISSIONS USING MULTIPLE SUBBANDS

(71) Applicant: QUALCOMM Incorporated, San Diego, CA (US)

(72) Inventors: Kapil Bhattad, Bangalore (IN); Tanumay Datta, Bangalore (IN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/993,192

(22) Filed: Aug. 13, 2020

(65) Prior Publication Data

US 2021/0051709 A1  Feb. 18, 2021

(30) Foreign Application Priority Data

Aug. 16, 2019  (IN) .............................. 201941033078

(51) Int. Cl.
*H04W 74/00* (2009.01)
*H04W 72/14* (2009.01)
(Continued)

(52) U.S. Cl.
CPC ......... *H04W 74/008* (2013.01); *H04L 1/0013* (2013.01); *H04W 72/0446* (2013.01);
(Continued)

(58) Field of Classification Search
CPC ........... H04W 74/008; H04W 72/1268; H04W 72/14; H04W 72/0493; H04W 72/0446;
(Continued)

(56) References Cited

U.S. PATENT DOCUMENTS

2016/0345206 A1\* 11/2016 Yerramalli ............ H04L 5/0053
2017/0135128 A1\*  5/2017 Yerramalli ........ H04W 74/0808
(Continued)

FOREIGN PATENT DOCUMENTS

WO  WO-2017196053 A2  11/2017
WO  WO-2019033118 A1 \*  2/2019  ........... H04L 5/0053
(Continued)

OTHER PUBLICATIONS

International Search Report and Written Opinion—PCT/US2020/046541—ISA/EPO—dated Oct. 30, 2020.
(Continued)

*Primary Examiner* — Ivan O Latorre
(74) *Attorney, Agent, or Firm* — Holland & Hart LLP/Qualcomm

(57) ABSTRACT

Methods, systems, and devices for wireless communications are described that support listen before talk (LBT) for uplink transmissions using multiple subbands. A base station may support communication with a user equipment (UE) via multiple subbands and may transmit an uplink grant to the UE that allocates resources of the multiple subbands for transmission of a shared data channel by the UE. The base station may include an indication within the uplink grant that indicates to the UE to perform a given type of LBT for each subband. After transmitting the uplink grant, the base station may transmit control information or other signaling (e.g., channel occupancy time system information (COT-SI)) that indicates subbands on which the UE is to perform a given type of LBT or other subbands on which the UE is to perform a different type of LBT.

30 Claims, 18 Drawing Sheets

(51) Int. Cl.
*H04W 72/04* (2009.01)
*H04W 74/08* (2009.01)
*H04L 1/00* (2006.01)
*H04W 72/12* (2009.01)

(52) U.S. Cl.
CPC ............. *H04W 72/0493* (2013.01); *H04W 72/1268* (2013.01); *H04W 72/14* (2013.01); *H04W 74/0808* (2013.01)

(58) Field of Classification Search
CPC ........... H04W 74/0808; H04W 74/006; H04W 16/14; H04L 1/0013; H04L 1/0069
See application file for complete search history.

(56) References Cited

U.S. PATENT DOCUMENTS

| | | | |
|---|---|---|---|
| 2019/0174542 | A1 | 6/2019 | Lei et al. |
| 2019/0200379 | A1* | 6/2019 | Wang .................. H04W 74/006 |
| 2020/0127796 | A1* | 4/2020 | Li ......................... H04W 72/14 |
| 2020/0145169 | A1* | 5/2020 | Zhou ...................... H04B 1/713 |
| 2020/0146058 | A1* | 5/2020 | Xu ........................ H04W 88/08 |
| 2020/0236677 | A1* | 7/2020 | Cui ........................ H04W 24/02 |
| 2020/0275484 | A1* | 8/2020 | Xu ........................ H04W 72/14 |
| 2020/0275490 | A1* | 8/2020 | Li ..................... H04W 74/0833 |
| 2020/0305145 | A1* | 9/2020 | Li ......................... H04W 72/02 |
| 2021/0051719 | A1 | 2/2021 | Bhattad et al. |
| 2021/0168783 | A1* | 6/2021 | Islam .................... H04L 5/0053 |
| 2021/0235496 | A1* | 7/2021 | Park ..................... H04L 5/0012 |
| 2021/0274551 | A1* | 9/2021 | Takata .................. H04W 72/04 |
| 2021/0392685 | A1* | 12/2021 | Myung ............. H04W 74/0816 |

FOREIGN PATENT DOCUMENTS

| | | | | |
|---|---|---|---|---|
| WO | WO-2020144402 | A1 * | 7/2020 | ........... H04L 5/0053 |
| WO | WO-2020201490 | A1 * | 10/2020 | ........ H04W 74/0808 |

OTHER PUBLICATIONS

Qualcomm Incorporated: "DL Signals and Channels for NR-U," 3GPP Draft, 3GPP TSG RAN WG1 Meeting #97, R1-1907259, 7.2.2.1.2 DL Signals and Channels for Nr-U, 3rd Generation Partnership Project (3GPP), Mobile Competence Centre, 650, Route Des Lucioles, F-06921, Sophia-Antipolis Cedex, France, vol. RAN WG1, No. Reno, US, May 13, 2019-May 17, 2019, May 13, 2019 (May 13, 2019), XP051728699, 12 pages, Retrieved from the Internet: URL: http://www.3gpp.org/ftp/Meetings%5F3GPP%5FSYNC/RAN1/Docs/R1%2D1907259%2Ezip, http://www.3gpp.org/ftp/Meetings%5F3GPP%5FSYNC/RAN1/Docs/R1%2D1907259%2Ezip[retrieved on May 13, 2019] section 4; p. 6-p. 8 section 7; p. 9-p. 10.

Qualcomm Incorporated: "Wideband Operation for NR-U",3GPP Draft, R1-1907265, 3GPP TSG RAN WG1 Meeting #97, 7.2.2.2.5 Wideband Operation for NR-U Operation, 3rd Generation Partnership Project (3GPP), Mobile Competence Centre, 650, Route Des Lucioles, F-06921 Sophia-Antipolis Cedex, vol. RAN WG1, No. Reno, US, May 13, 2019-Mar 17, 2019, May 13, 2019 (May 13, 2019), XP051728705, 8 Pages, Retrieved from the Internet:URL:http://www.3gpp.org/ftp/Meetings%5F3GPP%5FSYNC/RAN1/Docs/R1%2D1907265%2Ezip [retrieved on May 13, 2019] p. 6, Proposal 4-p. 7, Section 3.

* cited by examiner

LISTEN-BEFORE-TALK FOR UPLINK TRANSMISSIONS USING MULTIPLE SUBBANDS

CROSS REFERENCE

The present Application for Patent claims the benefit of Indian Provisional Patent Application No. 201941033078 by BHATTAD et al., entitled "LISTEN-BEFORE-TALK FOR UPLINK TRANSMISSIONS USING MULTIPLE SUBBANDS," filed Aug. 16, 2019, assigned to the assignee hereof, and expressly incorporated by reference herein.

FIELD OF TECHNOLOGY

The following relates generally to wireless communications and more specifically to listen before talk (LBT) for uplink transmissions using multiple subbands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In an unlicensed spectrum of a wireless communications system, wireless devices may implement an LBT procedure to monitor a channel on a subband prior to communicating using that subband. If the subband is occupied, the wireless device may wait a duration of time and monitor the channel again to see if it is occupied. If there are multiple subbands, however, the wireless device may not have sufficient time to perform LBT on all the subbands, or the device may not be capable of performing LBT on all the subbands, before preparing a transmission via the multiple subbands.

SUMMARY

The described techniques relate to improved methods, systems, devices, and apparatuses that support listen before talk (LBT) for uplink transmissions using multiple subbands. According to some aspects, a base station may support communication with a user equipment (UE) via multiple subbands and may transmit an uplink grant to the UE that allocates resources of the multiple subbands for transmission of a shared data channel by the UE. The base station may include an indication within the uplink grant that indicates to the UE to perform a given type of LBT for each subband. After transmitting the uplink grant, the base station may transmit control information or other signaling (e.g., channel occupancy time (COT) system information (COT-SI)) that indicates subbands on which the UE is to perform a given type of LBT or other subbands on which the UE is to perform a different type of LBT. For example, depending on the capabilities of the UE, the UE may perform a category 4 LBT procedure, which involves monitoring the subband, transmitting a request to send message, receiving a clear to send message, and transmitting an uplink transmission if the subband is unoccupied. In other examples, the UE may perform a category 2 LBT procedure, which involves monitoring the subband and transmitting a channel occupancy signal indicating that the UE is using or will use the subband.

In some examples, the UE may perform a category 2 LBT in subbands where the UE knows the base station has the COT and already occupies those subbands, and a category 4 LBT on the subbands where the base station does not already occupy the subbands. The UE may puncture or not puncture based on the outcomes of the category 2 or 4 LBT procedures.

The base station may transmit an uplink grant to the UE for the same uplink shared data channel over multiple subbands when the base station is unsure of subband information at the time of sending the uplink grant. The UE may combine resource allocations from the multiple uplink grants to determine the resource allocation for the uplink shared data channel. In some cases, the uplink shared data channel may include (e.g., may be multiplexed with) uplink control information (UCI) to avoid confusion between the base station and UE as to which subbands are being used for the uplink shared data channel.

A method of wireless communications at a UE is described. The method may include identifying a set of subbands supported by a base station in communication with the UE, receiving an uplink grant for transmission of an uplink shared data channel via a subset of the set of subbands in a transmission time interval, the uplink grant indicating an LBT procedure of a first type for the subset of the set of subbands in the transmission time interval, receiving, after receiving the uplink grant and within the transmission time interval, signaling that indicates one or more subbands of the subset associated with an LBT procedure of a second type, and performing LBT procedures of the first type or the second type on the subset of the set of subbands based on the uplink grant and the signaling.

An apparatus for wireless communications at a UE is described. The apparatus may include a processor, memory coupled with the processor, and instructions stored in the memory. The instructions may be executable by the processor to cause the apparatus to identify a set of subbands supported by a base station in communication with the UE, receive an uplink grant for transmission of an uplink shared data channel via a subset of the set of subbands in a transmission time interval, the uplink grant indicating an LBT procedure of a first type for the subset of the set of subbands in the transmission time interval, receive, after receiving the uplink grant and within the transmission time interval, signaling that indicates one or more subbands of the subset associated with an LBT procedure of a second type, and perform LBT procedures of the first type or the second type on the subset of the set of subbands based on the uplink grant and the signaling.

Another apparatus for wireless communications at a UE is described. The apparatus may include means for identifying a set of subbands supported by a base station in communication with the UE, receiving an uplink grant for transmission of an uplink shared data channel via a subset of the set of subbands in a transmission time interval, the uplink grant indicating an LBT procedure of a first type for the subset of the set of subbands in the transmission time interval, receiving, after receiving the uplink grant and within the transmission time interval, signaling that indicates one or more subbands of the subset associated with an LBT procedure of a second type, and performing LBT procedures of the first type or the second type on the subset of the set of subbands based on the uplink grant and the signaling.

A non-transitory computer-readable medium storing code for wireless communications at a UE is described. The code may include instructions executable by a processor to identify a set of subbands supported by a base station in communication with the UE, receive an uplink grant for transmission of an uplink shared data channel via a subset of the set of subbands in a transmission time interval, the uplink grant indicating an LBT procedure of a first type for the subset of the set of subbands in the transmission time interval, receive, after receiving the uplink grant and within the transmission time interval, signaling that indicates one or more subbands of the subset associated with an LBT procedure of a second type, and perform LBT procedures of the first type or the second type on the subset of the set of subbands based on the uplink grant and the signaling.

Some examples of the method, apparatuses, and non-transitory computer-readable medium described herein may further include operations, features, means, or instructions for puncturing the uplink shared data channel on at least one subband based on an unsuccessful LBT procedure for the at least one subband, and transmitting the uplink shared data channel via the subset of the set of subbands excluding the at least one subband based on the puncturing.

Some examples of the method, apparatuses, and non-transitory computer-readable medium described herein may further include operations, features, means, or instructions for performing LBT procedures of the second type on the one or more subbands of the subset based on the signaling, and transmitting the uplink shared data channel via each of the one or more subbands associated with a successful LBT procedure of the second type.

Some examples of the method, apparatuses, and non-transitory computer-readable medium described herein may further include operations, features, means, or instructions for transmitting the uplink shared data channel via the one or more subbands if each of the one or more subbands may be associated with a successful LBT procedure of the second type, where the uplink shared data channel may be rate matched on the one or more subbands.

Some examples of the method, apparatuses, and non-transitory computer-readable medium described herein may further include operations, features, means, or instructions for performing LBT procedures of the first type on a first subband of the subset based on the uplink grant, performing LBT procedures of the second type on a second subband of the subset based on the signaling, and transmitting the uplink shared data channel via each of the first and second subbands associated with a successful LBT procedure.

Some examples of the method, apparatuses, and non-transitory computer-readable medium described herein may further include operations, features, means, or instructions for performing LBT procedures of the first type on a first subband of the subset based on the uplink grant, performing LBT procedures of the second type on a second subband of the subset based on the signaling, and transmitting the uplink shared data channel via the first and second subbands if the first and second subbands may be associated with a successful LBT procedure.

Some examples of the method, apparatuses, and non-transitory computer-readable medium described herein may further include operations, features, means, or instructions for performing LBT procedures of the first type on the subset of the set of subbands based on the uplink grant and a capability of the UE, and transmitting the uplink shared data channel via each subband of the subset associated with a successful LBT procedure.

Some examples of the method, apparatuses, and non-transitory computer-readable medium described herein may further include operations, features, means, or instructions for transmitting the uplink shared data channel via the subset of the set of subbands if each of the subset may be associated with the successful LBT procedure.

Some examples of the method, apparatuses, and non-transitory computer-readable medium described herein may further include operations, features, means, or instructions for dropping the uplink shared data channel based on an unsuccessful LBT procedure on at least one subband of the subset.

Some examples of the method, apparatuses, and non-transitory computer-readable medium described herein may further include operations, features, means, or instructions for receiving multiple uplink grants via respective subbands of the subset of the set of subbands, where each of the multiple uplink grants includes resource allocation information for the uplink shared data channel.

In some examples of the method, apparatuses, and non-transitory computer-readable medium described herein, each of the multiple uplink grants includes the same resource allocation information for the uplink shared data channel via the respective subbands.

In some examples of the method, apparatuses, and non-transitory computer-readable medium described herein, each of the multiple uplink grants includes different resource allocation information for the uplink shared data channel.

Some examples of the method, apparatuses, and non-transitory computer-readable medium described herein may further include operations, features, means, or instructions for determining at least one subband of the subset for transmission of the uplink shared data channel based on the multiple uplink grants, where the at least one subband corresponds to a subband over which one of the multiple uplink grants may be received.

Some examples of the method, apparatuses, and non-transitory computer-readable medium described herein may further include operations, features, means, or instructions for transmitting the uplink shared data channel via the at least one subband, where the uplink shared data channel include UCI indicate the at least one subband used for transmission of the uplink shared data channel.

In some examples of the method, apparatuses, and non-transitory computer-readable medium described herein, the uplink grant includes a confidence indicator that indicates puncturing information for the subset of the set of subbands.

In some examples of the method, apparatuses, and non-transitory computer-readable medium described herein, the confidence indicator indicates which of the subset of the set of subbands may be available for the uplink shared data channel.

Some examples of the method, apparatuses, and non-transitory computer-readable medium described herein may further include operations, features, means, or instructions for preparing the uplink shared data channel for transmission to the base station via the subset of the set of subbands, puncturing the uplink shared data channel on the one or more subbands based on the signaling being received after preparing the uplink shared data channel for transmission, and transmitting, based on the puncturing, the uplink shared data channel via the subset of the set of subbands associated with a successful LBT procedure and excluding the one or more subbands, where the uplink shared data channel includes UCI indicating the subset of the set of subbands associated with the successful LBT procedure.

Some examples of the method, apparatuses, and non-transitory computer-readable medium described herein may further include operations, features, means, or instructions for receiving control information indicating to the UE to include UCI with the uplink shared data channel.

In some examples of the method, apparatuses, and non-transitory computer-readable medium described herein, the control information includes RRC information or DCI.

In some examples of the method, apparatuses, and non-transitory computer-readable medium described herein, the UCI includes subbands over which a punctured uplink shared data channel may be transmitted or subbands used for transmission of the uplink shared data channel.

Some examples of the method, apparatuses, and non-transitory computer-readable medium described herein may further include operations, features, means, or instructions for transmitting the uplink shared data channel via each subband of the subset associated with a successful LBT procedure, where the uplink shared data channel includes UCI indicating each subband of the subset associated with the successful LBT procedure.

Some examples of the method, apparatuses, and non-transitory computer-readable medium described herein may further include operations, features, means, or instructions for determining a set of resources of each subband for the UCI, where the set of resources may be based on one or more subbands of the subset subject to puncturing according to an unsuccessful LBT procedure.

Some examples of the method, apparatuses, and non-transitory computer-readable medium described herein may further include operations, features, means, or instructions for evenly distributing UCI across each subband, where the UCI includes information other than information indicating each subband of the subset associated with the successful LBT procedure.

Some examples of the method, apparatuses, and non-transitory computer-readable medium described herein may further include operations, features, means, or instructions for determining a set of resources of each subband for the UCI based on a number of the subset of the set of subbands indicated in the uplink grant, a number of subbands used for transmission of the uplink shared data channel, a number of subbands associated with the LBT procedure of the second type, all of the set of subbands supported by the base station for communications with the UE, or any combination thereof.

Some examples of the method, apparatuses, and non-transitory computer-readable medium described herein may further include operations, features, means, or instructions for multiplexing UCI with the uplink shared data channel via at least one subband independent of a number of subbands used for transmission of the uplink shared data channel.

In some examples of the method, apparatuses, and non-transitory computer-readable medium described herein, a same number of symbols for the at least one subband may be used for multiplexing the UCI irrespective of other subbands.

Some examples of the method, apparatuses, and non-transitory computer-readable medium described herein may further include operations, features, means, or instructions for preparing the uplink shared data channel for transmission to the base station via the subset of the set of subbands associated with a successful LBT procedure based on the signaling, where the signaling may be received before a threshold time for preparation of the uplink shared data channel, and transmitting the prepared uplink shared data channel.

Some examples of the method, apparatuses, and non-transitory computer-readable medium described herein may further include operations, features, means, or instructions for receiving the signaling after a threshold time for preparation of the uplink shared data channel, and transmitting the uplink shared data channel irrespective of the signaling.

Some examples of the method, apparatuses, and non-transitory computer-readable medium described herein may further include operations, features, means, or instructions for receiving the signaling after a threshold time for preparation of the uplink shared data channel, and dropping the uplink shared data channel based on the signaling.

Some examples of the method, apparatuses, and non-transitory computer-readable medium described herein may further include operations, features, means, or instructions for receiving the signaling after a threshold time for preparation of the uplink shared data channel, puncturing the uplink shared data channel via the one or more subbands indicated by the signaling, and transmitting the uplink shared data channel via the subset of the set of subbands excluding the one or more subbands based on the puncturing.

In some examples of the method, apparatuses, and non-transitory computer-readable medium described herein, the LBT procedure of the first type includes a category 4 LBT procedure, and the LBT procedure of the second type includes a category 2 LBT procedure.

A method of wireless communications at a base station is described. The method may include identifying a set of subbands supported by the base station in communication with a UE, transmitting an uplink grant for an uplink shared data channel via a subset of the set of subbands in a transmission time interval, the uplink grant indicating an LBT procedure of the first type for the subset of the set of subbands in the transmission time interval, performing an LBT procedure for each of the subset of the set of subbands, and transmitting, after transmitting the uplink grant and within the transmission time interval, signaling that indicates one or more subbands of the subset associated with an LBT procedure of a second type based on performing the LBT procedure.

An apparatus for wireless communications at a base station is described. The apparatus may include a processor, memory coupled with the processor, and instructions stored in the memory. The instructions may be executable by the processor to cause the apparatus to identify a set of subbands supported by the base station in communication with a UE, transmit an uplink grant for an uplink shared data channel via a subset of the set of subbands in a transmission time interval, the uplink grant indicating an LBT procedure of the first type for the subset of the set of subbands in the transmission time interval, perform an LBT procedure for each of the subset of the set of subbands, and transmit, after transmitting the uplink grant and within the transmission time interval, signaling that indicates one or more subbands of the subset associated with an LBT procedure of a second type based on performing the LBT procedure.

Another apparatus for wireless communications at a base station is described. The apparatus may include means for identifying a set of subbands supported by the base station in communication with a UE, transmitting an uplink grant for an uplink shared data channel via a subset of the set of subbands in a transmission time interval, the uplink grant indicating an LBT procedure of the first type for the subset of the set of subbands in the transmission time interval, performing an LBT procedure for each of the subset of the set of subbands, and transmitting, after transmitting the uplink grant and within the transmission time interval, signaling that indicates one or more subbands of the subset associated with an LBT procedure of a second type based on performing the LBT procedure.

A non-transitory computer-readable medium storing code for wireless communications at a base station is described. The code may include instructions executable by a processor to identify a set of subbands supported by the base station in communication with a UE, transmit an uplink grant for an uplink shared data channel via a subset of the set of subbands in a transmission time interval, the uplink grant indicating an LBT procedure of the first type for the subset of the set of subbands in the transmission time interval, perform an LBT procedure for each of the subset of the set of subbands, and transmit, after transmitting the uplink grant and within the transmission time interval, signaling that indicates one or more subbands of the subset associated with an LBT procedure of a second type based on performing the LBT procedure.

Some examples of the method, apparatuses, and non-transitory computer-readable medium described herein may further include operations, features, means, or instructions for monitoring each subband of the subset for the uplink shared data channel from the UE after transmitting the signaling.

Some examples of the method, apparatuses, and non-transitory computer-readable medium described herein may further include operations, features, means, or instructions for receiving the uplink shared data channel via at least one subband of the subset, the uplink shared data channel including UCI that indicates subbands of the subset over which the uplink shared data channel may be transmitted or punctured.

In some examples of the method, apparatuses, and non-transitory computer-readable medium described herein, the UCI includes subbands over which a punctured uplink shared data channel may be transmitted or subbands used for transmission of the uplink shared data channel.

Some examples of the method, apparatuses, and non-transitory computer-readable medium described herein may further include operations, features, means, or instructions for transmitting multiple uplink grants via respective subbands of the subset of the set of subbands, where each of the multiple uplink grants includes resource allocation information for the uplink shared data channel.

In some examples of the method, apparatuses, and non-transitory computer-readable medium described herein, each of the multiple uplink grants includes the same resource allocation information for the uplink shared data channel via the respective subbands.

In some examples of the method, apparatuses, and non-transitory computer-readable medium described herein, each of the multiple uplink grants includes different resource allocation information for the uplink shared data channel.

Some examples of the method, apparatuses, and non-transitory computer-readable medium described herein may further include operations, features, means, or instructions for transmitting control information to the UE that indicates to the UE to include UCI with the uplink shared data channel.

In some examples of the method, apparatuses, and non-transitory computer-readable medium described herein, the control information includes RRC information or DCI.

Some examples of the method, apparatuses, and non-transitory computer-readable medium described herein may further include operations, features, means, or instructions for monitoring multiple hypothesis for UCI from the UE based on the UE and the base station being out of sync.

DETAILED DESCRIPTION

Figure 1:
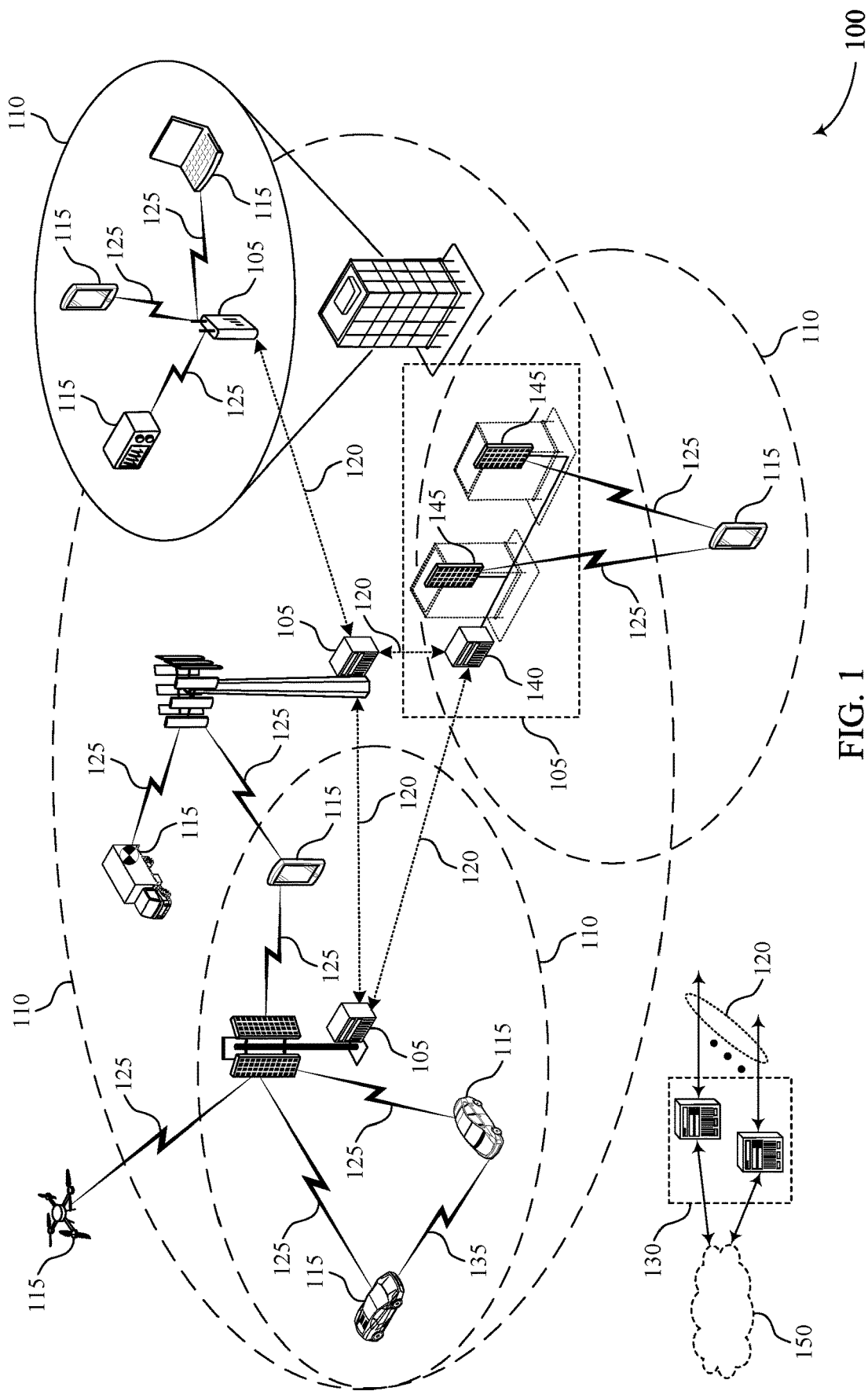
FIG. 1 illustrates an example of a wireless communications system that supports listen before talk (LBT) for uplink transmissions using multiple subbands in accordance with aspects of the present disclosure.

A base station may support multiple subbands in an unlicensed spectrum band for communications with a user equipment (UE). To utilize one or more of the multiple subbands, the base station may perform a listen before talk (LBT) procedure on all the subbands to sense whether a given subband is occupied (e.g., by other devices). During an LBT duration of 9 µs, a base station may have 4 µs of sensing and 5 µs of processing prior to gaining access to the one or more subbands during a channel occupancy time (COT). That is, the base station may have limited amount of time to determine if a given subband is available prior to winning use of the subband for a COT. Further, once the LBT procedure is complete for a given subband, the base station may start to communicate with a UE before another wireless device attempts to gain access to the subband.

A base station may transmit an indication to a UE indicating whether the base station is confident about a subband availability. The confidence indication may specify if any data packets are to be punctured for an uplink shared data channel transmission in a given subband.

In some examples, the base station may send an uplink grant to a UE, but the base station may be unable to confirm what type of LBT (e.g., category 2 or category 4) is to be used on all the subbands. The base station may include in the uplink grant whether the UE is to perform a category 2 LBT (i.e., LBT including one-time channel sensing for a fixed period without a back-off period) or category 4 LBT (i.e., LBT with a random (or other) back-off period and a variable sized contention window). The base station may also send instruction in COT system information (COT-SI) to specify which type of LBT the UE is to perform for one or more subbands of the multiple subbands.

In some examples, the UE may perform a category 2 LBT in subbands where the UE knows the base station has the COT and already occupies those subbands, and a category 4 LBT on the subbands where the base station does not already occupy the subbands. The UE may puncture (e.g., chose not to send an uplink shared data channel via a given subband) based on the outcome of the category 2 or 4 LBT procedures on the multiple subbands.

The base station may transmit an uplink grant to the UE for the same physical uplink shared channel (PUSCH) over multiple subbands when the base station is unsure of the subband information at the time of sending the uplink grant. The UE may combine all the resource allocation from the multiple grants to determine the resource allocation for the uplink shared data channel. The uplink shared data channel transmission may include uplink control information (UCI) to avoid confusion between the base station and UE about which subbands are being used.

Aspects of the disclosure are initially described in the context of wireless communications systems. Aspects are then described with respect to a timeline, channel occupancies, and a process flow. Aspects of the disclosure are further illustrated by and described with reference to apparatus diagrams, system diagrams, and flowcharts that relate to LBT for uplink transmissions using multiple subbands.

FIG. 1 illustrates an example of a wireless communications system 100 that supports LBT for uplink transmissions using multiple subbands in accordance with aspects of the present disclosure. The wireless communications system 100 may include base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta$f) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARD) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may support communications between a UE 115 and a base station 105 using multiple subbands of an unlicensed spectrum. The base station 105 may transmit an initial grant to the UE 115 for a shared data channel (e.g., a PUSCH, a physical downlink shared channel (PDSCH)) to be transmitted via the multiple subbands. The initial grant may include a confidence indicator that indicates whether the base station 105 is confident of the resource allocation included in the initial grant. After the initial grant, the base station 105 may determine which of the subbands are available for communication of the shared data channel by performing LBT for each of the multiple subbands. The base station 105 may then transmit an indication of which of the subbands are available for communication of the shared data channel with the UE 115.

The UE 115 may receive an initial uplink grant from the base station 105 for transmission of a shared data channel via multiple subbands of an unlicensed spectrum. The UE 115 may determine which of the multiple subbands are available for communication by performing category 2 or category 4 LBT procedures for the multiple subbands. The determination of which of the multiple subbands are available or punctured, the UE 115 may use the confidence indicator from the base station 105 or other factors such as additional CAT-SI received after the initial grant that indicates which of the subbands are available or punctured.

Figure 2:
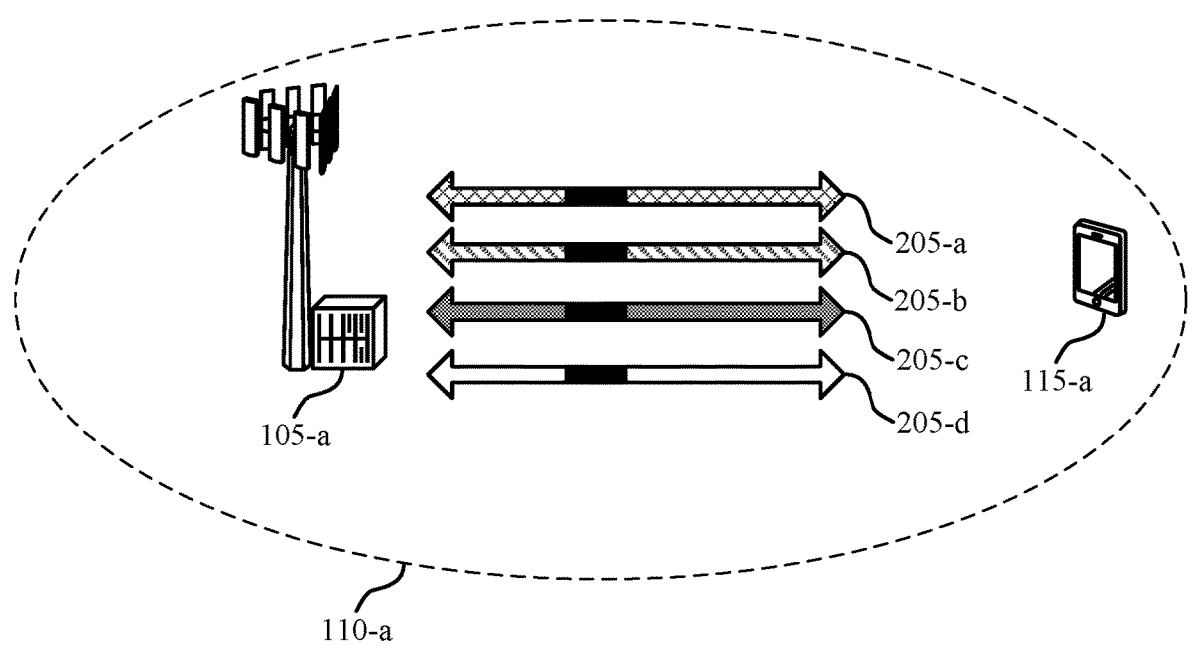
FIG. 2 illustrates an example of a wireless communications system that supports LBT for uplink transmissions using multiple subbands in accordance with aspects of the present disclosure.

FIG. 2 illustrates an example of a wireless communications system 200 that supports LBT for uplink transmissions using multiple subbands in accordance with aspects of the present disclosure. In some examples, wireless communications system 200 may implement aspects of wireless communications system 100. As shown, wireless communications system 200 includes base station 105-*a* and UE 115-*a*, which may be examples of the corresponding devices described with reference to FIG. 1.

Base station 105-*a* may provide a coverage area 110-*a* within which UE 115-*a* and base station 105-*a* may perform communications via communication links. The communication links may include one or more channels of an unlicensed spectrum. In the unlicensed spectrum, one or more channels may span or include multiple subbands 205, which may be supported by the base station 105-*a* for communications with the UE 115-*a*. An LBT procedure may be performed (e.g., by a base station 105-*a*) to monitor if a given subband 205 is occupied. If the subband 205 is unoccupied, base station 105-*a* may use the subband 205 for communications with UE 115-*a*. As shown, the multiple subbands 205 may include subbands 205-*a*, 205-*b*, 205-*c*, and 205-*d*.

In some examples, base station 105-*a* may send a confidence indicator 210 (e.g., one or more bits of information related to a confidence level of the base station 105-*a*). The confidence indicator 210 may be included in a control channel (e.g., a physical downlink control channel (PDCCH)) transmitted to the UE 115-*a* via one or more subbands 205. The confidence indicator 210 may indicate whether the base station is confident about the availability of one or more subbands 205 for a shared data channel (e.g., PUSCH, PDSCH) for the UE 115-*a*. Base station 105-*a* may indicate the resource allocation or the confidence indicator 210 in DCI of the PDCCH, and the confidence indicator 210 may indicate whether the DCI includes an actual assignment (e.g., base station 105-*a* is confident about the subband availability of the resource assignment) or an assumed assignment (e.g., the base station 105-*a* is not confident about the subband availability of the resources assignment such that one or more subbands 205 may be subject to puncturing).

In some examples, a confidence bit of 1 in subband 205-*a* may indicate to UE 115-*a* that no puncturing was done on the PDSCH transmitted via subband 205-*a* or that no puncturing is to be performed by the UE 115-*a* when transmitting PUSCH via subband 205-*a*. A confidence bit of 0 in subband 205-*a* may indicate to UE 115-*a* that base station 105-*a* is unsure if subband 205-*a* is available. This may be because at the time of preparing the PDCCH that includes the confidence bit, the base station 105-*a* may not yet have performed LBT on the subband 205-*a* or may have performed LBT on the subband 205-*a* but may still be processing the results of the LBT.

In some examples, subband usage may be in COT-SI or other control information transmitted after an initial grant to the UE 115-*a*. For example, an initial grant transmitted by the base station 105-*a* may include a confidence indicator 210 having a bit value of 0. After transmitting the initial grant, the base station 105-*a* may transmit COT-SI which may include a second confidence indicator 210 having a bit value of 1, which may indicate to the UE 115-*a* that the information included in COT-SI is accurate (e.g., the information is based on subband availability). In some cases, the confidence indicator 210 may indicate that a given subband is subject to puncturing (e.g., the base station 105-*a* may puncture a PDSCH transmission over the subband or the UE 115-*a* is to puncture the PUSCH transmission over the subband). COT-SI may be sent multiple times in a COT and may contain the confidence bit of 0 or 1 based on whether the base station 105-*a* has knowledge of puncturing of the PDSCH symbol in the subband.

The confidence bit may be included in the DCI associated with the PDCCH from the base station. The DCI may indicate to the UE whether the base station is confident of subband information. A confidence bit of 1 in the DCI may indicate that the UE may use category 2 LBT for all the subbands. The DCI may indicate whether the UE should puncture any downlink or uplink transmissions. The indication to puncture may be jointly coded with the confidence information 210 in the DCI. Base station 105-*a* may transmit PDCCH with an uplink grant indicating valid subbands to UE 115-*a*.

In some examples, a base station may support various types of UEs. A type of UE 115-*a* may not have puncturing capability and may perform a category 2 or 4 LBT on all allocated subbands 205. If the LBT fails in any of the subbands 205, the UE 115-*a* may drop the whole data packet and not transmit on the uplink transmission. The UE 115-*a* may only transmit if all the subbands 205 pass the LBT. Another type of UE 115-*a* may create data packets for all allocated subbands 205 and if any subbands 205 fail the LBT, the UE 115-*a* may puncture the data packets in those subbands 205. In this way, the UE 115-*a* may still transmit even if the LBT failed on a subband 205.

Figure 3:
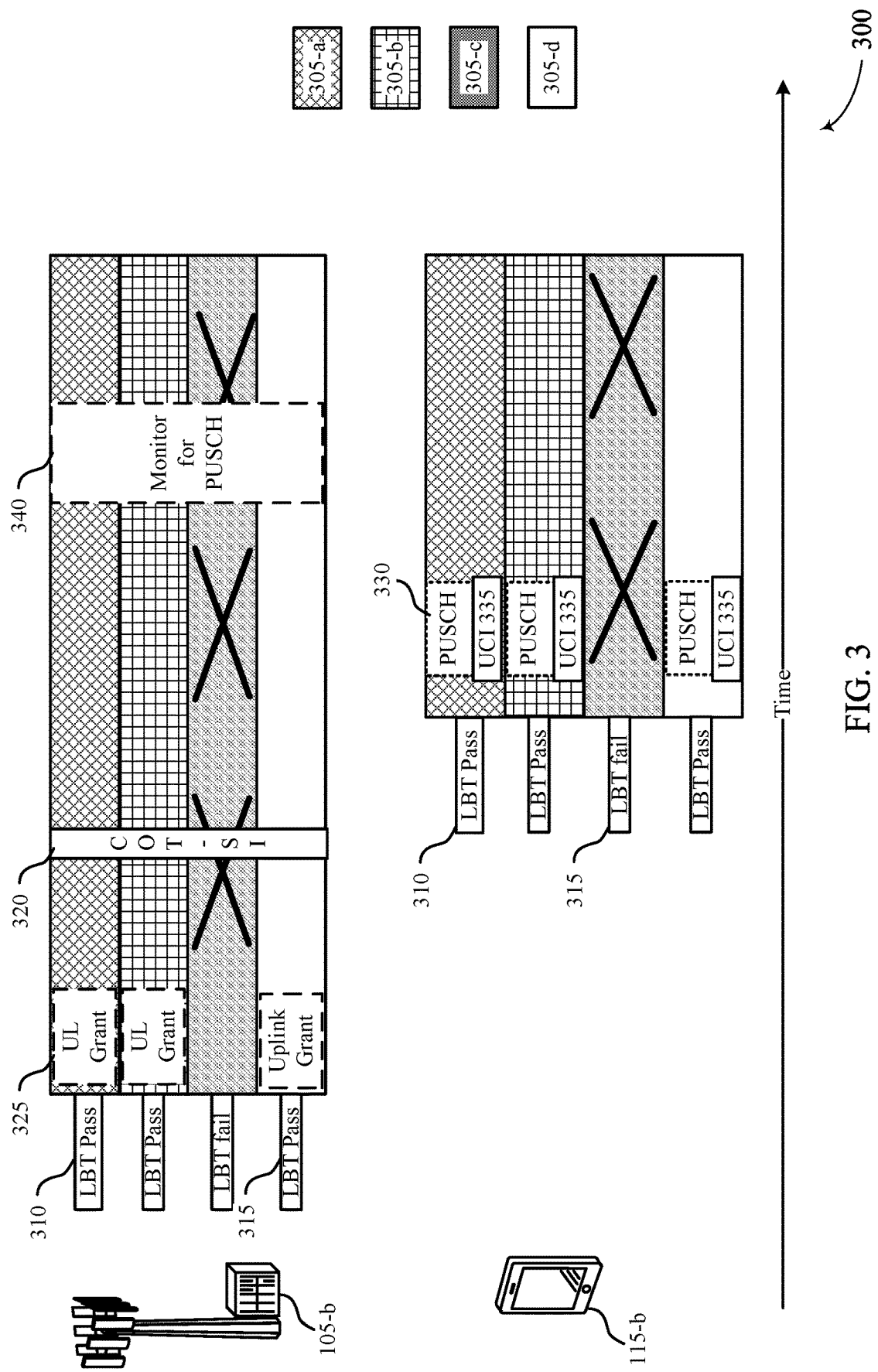
FIG. 3 illustrates an example of a timeline that supports LBT for uplink transmissions using multiple subbands in accordance with aspects of the present disclosure.

FIG. 3 illustrates an example of a wireless communications system 300 that supports techniques for LBT for uplink transmissions using multiple subbands in accordance with various aspects of the present disclosure. In some examples, wireless communications system 300 may implement aspects of wireless communications system 100. As shown, wireless communications system 300 includes base station 105-*b* and UE 115-*b*, which may be examples of the corresponding devices described with reference to FIGS. 1 and 2.

Base station 105-*b* and UE 115-*b* may be configured to communicate via subbands 305-*a*, 305-*b*, 305-*c*, and 305-*d* of an unlicensed spectrum. Once the subbands 305 have been configured, base station 105-*b* and UE 115-*b* may perform LBT procedures (e.g., category 2 LBT or category 4 LBT) to verify the availability of the subbands. LBT pass 310 may indicate that subbands 305-*a*, 305-*b*, and 305-*d* is available and LBT fail 315 may indicate that subband 305-*c* is not available.

Base station 105-*b* may send uplink grant 325 to UE 115-*b* to indicate to the UE 115-*a* to use category 2 or 4 LBT for all subbands 305. Base station 105-*b*, upon gaining access to subbands 305-*a*, 305-*b*, and 305-*d* may send COT-SI 320 containing subband information to UE 115-*b*. Base station 105-*b* may instruct UE 115-*b* to use a category 2 LBT and begin transmission as base station 105-*b* has gained access to subbands 305-*a*, 305-*b*, and 305-*d*. UE 115-*b* may receive the COT-SI 320 from base station 105-*b* with instructions to use the category 2 LBT on subbands 305-*a*, 305-*b*, and 305-*c*. For example, COT-SI 320 may indicate the subbands 305-*a*, 305-*b*, and 305-*d* were acquired by base station 105-*b*. Further UE 115-*b* may compare the COT-SI 320 with the uplink grant 325 and determine to use category 4 LBT before transmitting on subband 305-*c*, due to base station 105-*b* not gaining access to subband 305-*c*. Before PUSCH 330, UE 115-*b* may use category 2 LBT for the subbands 305 when base station 105-*b* has the COT and category 4 LBT for the subbands base station 105-*b* does not have the COT.

In some examples, UE 115-*b* may prepare PUSCH 330 packets for all allocated subbands 305-*a*, 305-*b*, 305-*c*, and 305-*d*. UE 115-*b* may puncture PUSCH 330 transmissions on subband 305-*c* if LBT fails 315. UE 115-*b* may perform a category 2 LBT on subbands 305-*a*, 305-*b*, and 305-*d* since UE 115-*b* knows base station 105-*b* has access to those subbands, and may only transmit if the subbands pass the category 2 LBT. In some cases, depending on UE capability, UE 115-*b* may not attempt to transmit on subband 305-*c* as base station 105-*b* does not have access to subband 305-*c*. In some cases, UE 115-*b* may try a combination of category 2 and 4 LBT procedures and transmit on the subbands where the LBT passes 310. In other cases, UE 115-*b* may use category 4 LBT on all subbands 305-*a*, 305-*b*, 305-*c*, and 305-*d*, and transmit over the those that the LBT passes 310. UE 115-*b* may include a UCI 335 with one or more PUSCHs 330 to indicate to base station 105-*b* that transmission data on subband 305-*c* was punctured or that transmission of PUSCH 330 was attempted on subbands 305-*a*, 305-*b*, and 305-*d*. The UCI 335 may be multiplexed with the PUSCH 330.

In some examples, UE 115-*b* may not have the ability to puncture transmissions in subbands. UE 115-*b* may only use category 2 LBT or only use category 4 LBT on subbands 305-*a*, 305-*b*, and 305-*d*, which base station 105-*b* has gained access. UE 115-*b* may rate match to subbands 305-*a*, 305-*b*, and 305-*d* and only transmit if all of subbands 305-*a*, 305-*b*, and 305-*d* pass LBT. UE 115-*b* may include UCI 335 with PUSCH 330 to indicate to base station 105-*b* on which subbands the UE 115-*a* is transmitting. UE 115-*b* may implement a combination of category 2 and 4 LBT on all subbands 305-*a*, 305-*b*, 305-*c*, and 305-*d*, and transmit if all the subbands 305 pass the LBT. If the LBT fails 315 for any of these subbands (e.g., subband 305-*d*), UE 115-*b* may drop the packet. Base station 105-*b* and UE 115-*b* may both perform an LBT procedure to see which subbands 305 are available. If both the LBT procedures produce that subband 305-*c* is unavailable, then there is no issue with UE 115-*b* puncturing the PUSCH 330. In some cases, UE 115-*b* may have to puncture the PUSCH 330 transmission in subband 305-*c* if the subband information is not received at the UE 115-*b* before the PUSCH 330 transmission. UE 115-*b* may inform base station 105-*b* about puncturing the PUSCH 330 transmission in subband 305-*c*.

In some examples, base station 105-*b* may send to UE 115-*b* uplink grant 325 for the same PUSCH 330 over subbands 305-*a*, 305-*b*, 305-*c*, and 305-*d*, when base station 105-*b* is unsure of subband information at the time of sending uplink grant 325. The uplink grants may be identical or may have differences in resource allocation. UE 115-*b* may combine all the grants to determine the resource allocation. The uplink grants may include resource allocation information for each of the subbands 305-*a*, 305-*b*, 305-*c*, and 305-*d* and UE 115-*b* has to determine which subbands 305 to use for PUSCH 330 transmission after performing LBT on each of the subbands 305 or based on which subbands 305 the UE 115-*b* detected the uplink grants. UE 115-*b* may send UCI 335 along with the PUSCH 330, and the UCI 335 may indicate the subbands 305 used for transmission of the PUSCH 330.

In some examples, the PUSCH 330 transmission may include UCI 335 when there is a chance of confusion between base station 105-*b* and UE 115-*b* about which subbands are being used. UCI 335 may be included implicitly based on a chance of confusion, or can be explicitly enabled control information (e.g., via RRC or DCI). For example, the base station 105-*b* may transmit an RRC message or may include information in DCI that indicates to the UE 115-*b* to include UCI 335 with the PUSCH 330. In some cases, UCI 335 may include information about which subbands 305 on which UE 115-*b* attempted transmission of the PUSCH 330 or which subbands PUSCH 330 is transmitted. Base station 105-*b* may monitor 340 the subbands 305 for the PUSCH 330.

In some cases, resource elements (REs) used for the UCI 335 may be a function of whether UE 115-b may be allowed to puncture the PUSCH 330. The UCI multiplexing rules in may lead to the UCI bits being spread equally across all subbands 305-a, 305-b, 305-c, and 305-d. For example, UCI multiplexing is such that the modulation may occur and rate matching may be performed on the number of REs that UE 115-b is using for transmission. In some cases, this may apply to all UCI 335 and is not limited to subband information of the UCI 335.

In some examples, base station 105-b may become unaware of which subbands UE 115-b is attempting to transmit on and how the UCI 335 is multiplexed. Base station 105-b may become aware based on UE 115-b and base station 105-b being in synchronization and the UCI multiplexing may be based on the allocated subbands in the uplink grant 325. When base station 105-b and UE 115-b are not in synchronization, base station 105-b may learn of the UCI multiplexing based on the subbands 305 on which UE 115-b attempts to transmit the PUSCH 330. The UCI 335 may be multiplexed only on subbands 305 which UE 115-b performs category 2 LBT (and LBT passes 310).

In some cases, base station 105-b may monitor hypothesis to determine which subbands 305 were used by UE 115-b for transmission. Multiple hypothesis may include base station 105-b testing each subband 305 to determine if UE 115-b is using the subband 305. UCI 335 may assume a larger set of subbands that both base station 105-b and UE 115-b are in sync on (e.g., all subbands, all allocated subbands) but only subset of these subbands may be considered by UE 115-b for transmission. In UCI multiplexing the same modulations symbols for UCI may be sent in a particular subband independent of how many subbands UE 115-b attempts to transmit on.

Figure 4A:
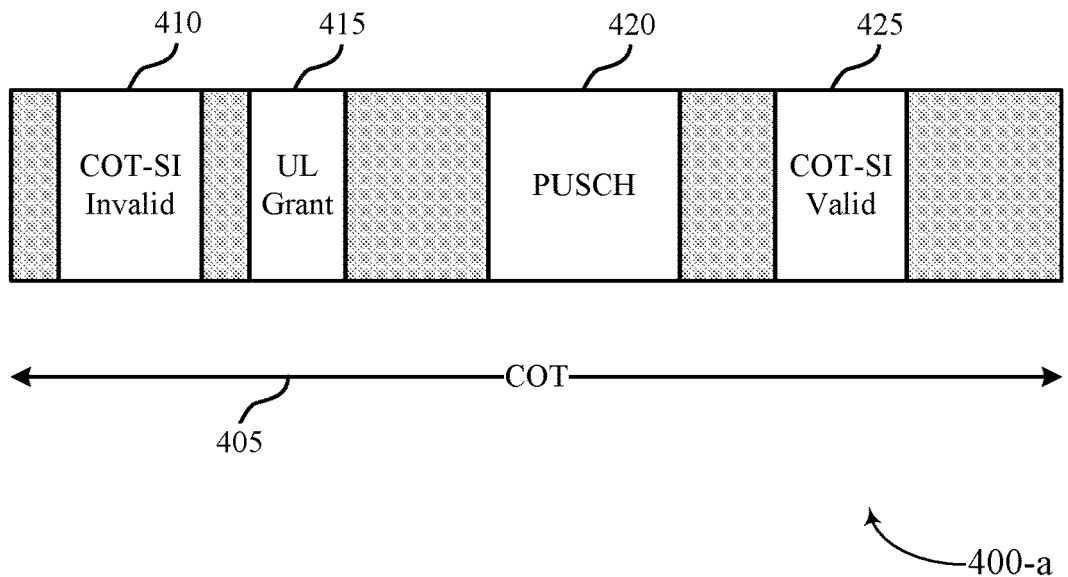
FIGS. 4A and 4B illustrate examples of channel occupancies that support LBT for uplink transmissions using multiple subbands in accordance with aspects of the present disclosure.
Figure 4B:
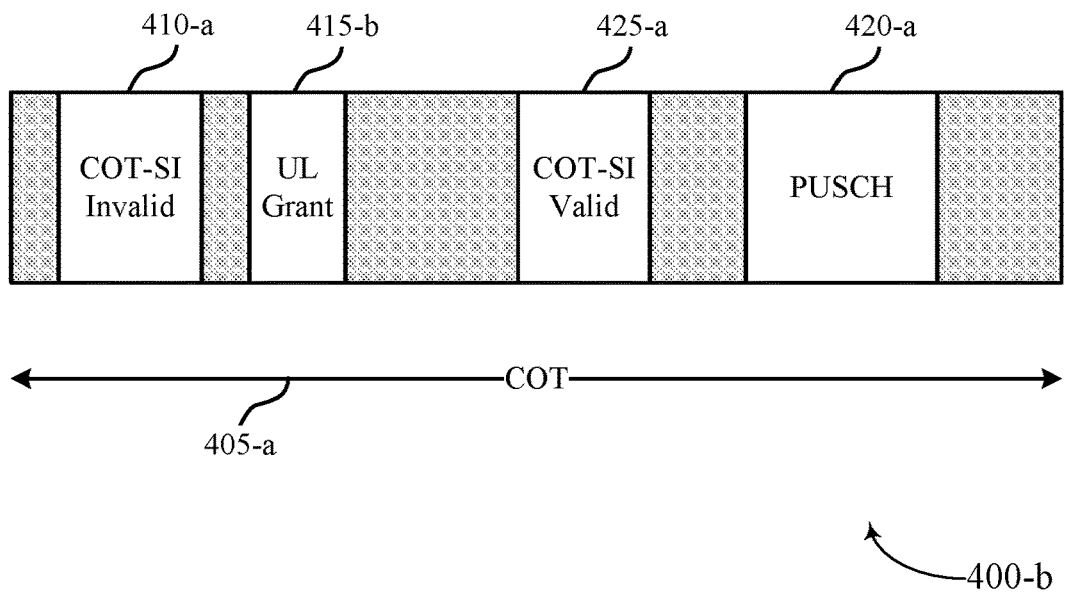

FIG. 4A and FIG. 4B illustrate an example of channel occupancies 400 that supports techniques for LBT for uplink transmissions using multiple subbands in accordance with various aspects of the present disclosure.

In FIG. 4A, a UE may send a PUSCH 420 to a base station during COT 405. The base station may send uplink grant 415 before subband information is available at the base station. The UE may not know the valid COT-SI 425 before transmitting PUSCH 420 to the base station. As a result, the UE may perform an LBT on each of the subbands and may transmit the subbands that are available. The base station may transmit an invalid COT-SI 410 and uplink grant 415 before PUSCH 420, and the valid COT-SI 425 once the base station knows which subbands the base station has gained access. In some cases, if the valid subband information is available faster than the PUSCH 420 preparation time, the UE may send PUSCH 420 on the correct subband.

In FIG. 4B, the UE may send a PUSCH 420-a to a base station during COT 405-a. The base station may send uplink grant 415-a before subband information is available at the base station. In some cases, the base station may transmit valid COT-SI 425-a before PUSCH 420-a is transmitted to the base station. As a result, the UE may perform an LBT of the subband and may transmit on the subband if it is available and may determine the type of LBT to perform for each subband based on the valid COT-SI 425-a. The base station may transmit an invalid COT-SI 410-a and uplink grant 415-a before the valid COT-SI 425-a. In a first case, if the valid subband information is available after the PUSCH 420-a preparation time and valid COT-SI 425-a is the same as the invalid COT-SI 410, then the UE may transmit PUSCH 420-a already prepared. In a second case, if the valid subband information is available after the PUSCH 420-a preparation time but valid COT-SI 425-a is the not the same as the invalid COT-SI, then the UE may drop the already prepared PUSCH 420-a. In a third case, if the valid subband information is available after the PUSCH 420-a preparation time but valid COT-SI 425-a is the not the same as the invalid COT-SI, then the UE may puncture the already prepared PUSCH 420-a and transmit to the base station.

Figure 5:
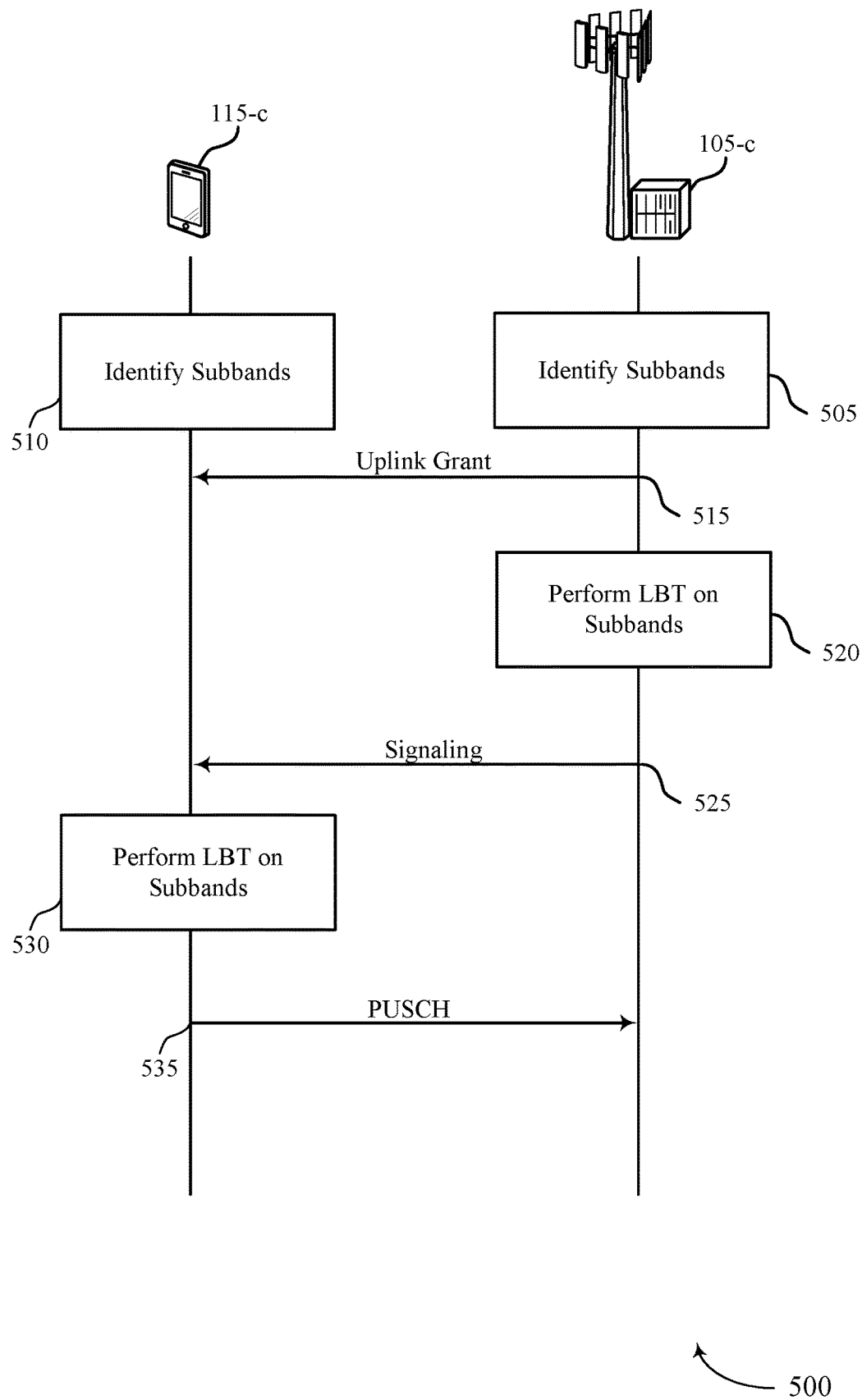
FIG. 5 illustrates an example of a process flow that supports LBT for uplink transmissions using multiple subbands in accordance with aspects of the present disclosure.

FIG. 5 illustrates an example of a process flow 500 that supports LBT for uplink transmissions using multiple subbands in accordance with aspects of the present disclosure. In some examples, process flow 500 may implement aspects of wireless communication systems 100. or 200. For example, process flow 500 may include base station 105-c and UE 115-c, which may be examples of the corresponding devices described with reference to FIG. 1 or 2.

At 505, base station 105-c may identify a number of subbands which are supported by base station 105-c in communication with UE 115-c. At 510, UE 115-c may identify a number of subbands which are supported by base station 105-c in communication with UE 115-c. At 515, base station 105-c may transmit an uplink grant for an uplink shared data channel via a subset of the identified subbands in a transmission time interval (TTI). The uplink grant may comprise a confidence indicator which indicates puncturing information for the subset of subbands or which of the subset of subbands is available for the uplink shared data channel. The uplink grant may indicate an LBT procedure (e.g., category 2 or category 4) for the subset of identified subbands. Base station 105-c may transmit multiple uplink grants including the same or different resource allocation information for the uplink shared data channel. Base station 105-c may transmit control information to UE 115-c that indicates to UE 115-c to include UCI with the uplink shared data channel. Base station 105-c may monitor for multiple hypothesis for UCI from UE 115-c based on base station 105-c and UE 115-c being in sync.

At 520, base station 105-c may perform an LBT procedure for each of the subset of identified subbands. At 525, base station 105-c may transmit signaling that indicates subbands in the subset of subbands associated with the LBT procedure. Base station 105-c may monitor the subset of subbands for the uplink shared data channel transmission from the UE 115-c.

At 530, UE 115-c may perform an LBT procedure on the subset of subbands based on the uplink grant from base station 105-c. UE 115-c may puncture the uplink shared data channel on one of the subbands based on the LBT procedure results. UE 115-c may drop the uplink shared data channel passed on an unsuccessful LBT procedure on a subband of the subset. UE 115-c may prepare the uplink shared data channel for transmission to base station 105-c. At 535, UE 115-c may transmit the uplink shared data channel via the subbands with successful LBT procedures. The uplink shared data channel may be rate matched on one or more of the subbands. Base station 105-c may receive the uplink shared data channel transmission via one or more of the subbands in the subset of subbands. The uplink control data channel transmission may include UCI which indicates subbands of the subset of subbands over which the uplink shared data channel is transmitted or punctured.

Figure 6:
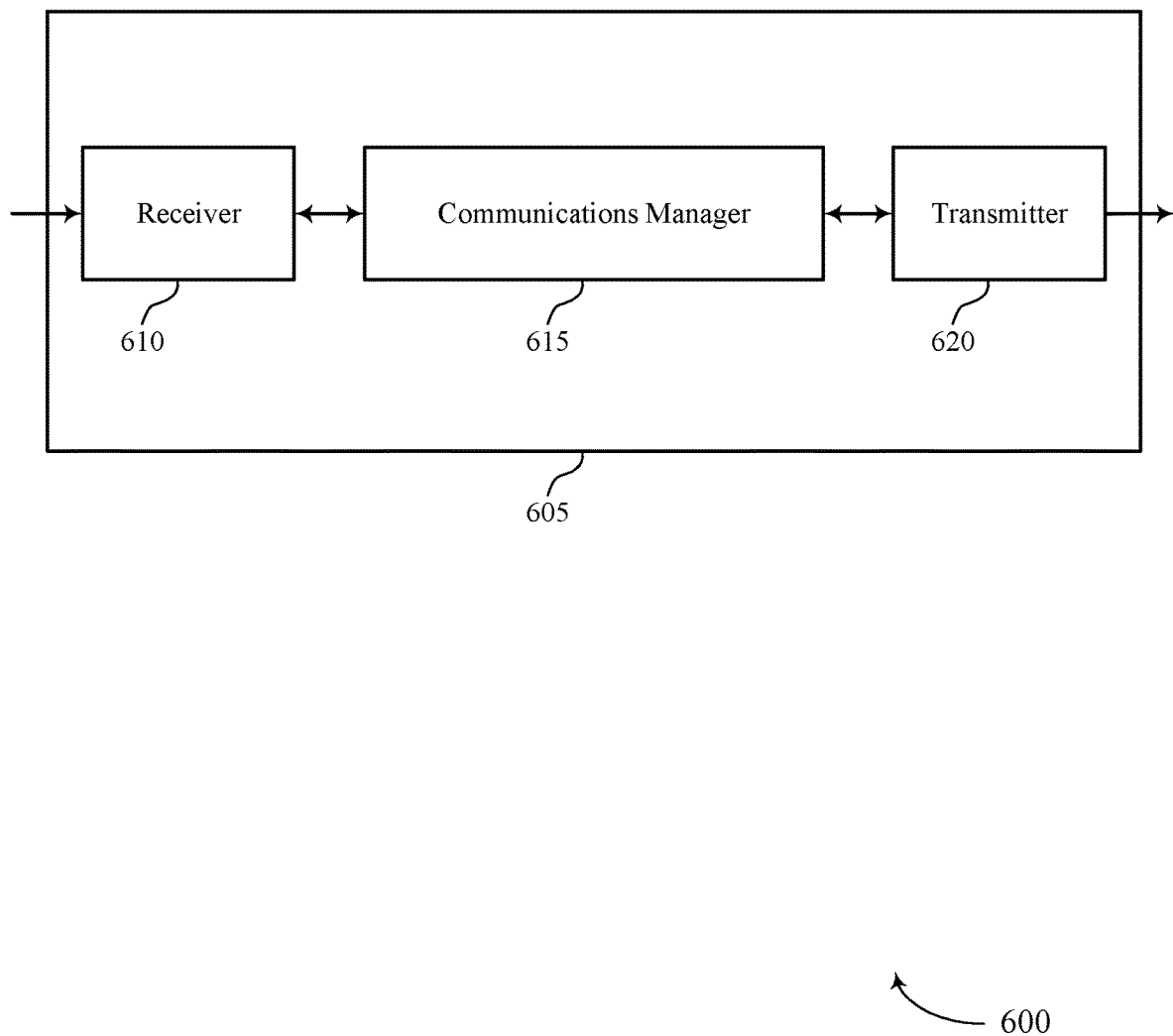
FIGS. 6 and 7 show block diagrams of devices that support LBT for uplink transmissions using multiple subbands in accordance with aspects of the present disclosure.

FIG. 6 shows a block diagram 600 of a device 605 that supports LBT for uplink transmissions using multiple subbands in accordance with aspects of the present disclosure. The device 605 may be an example of aspects of a UE 115 as described herein. The device 605 may include a receiver 610, a communications manager 615, and a transmitter 620.

The device 605 may also include a processor. Each of these components may be in communication with one another (e.g., via one or more buses).

The receiver 610 may receive information such as packets, user data, or control information associated with various information channels (e.g., control channels, data channels, and information related to LBT for uplink transmissions using multiple subbands, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify a set of subbands supported by a base station in communication with the UE, receive an uplink grant for transmission of an uplink shared data channel via a subset of the set of subbands in a transmission time interval, the uplink grant indicating an LBT procedure of a first type for the subset of the set of subbands in the transmission time interval, receive, after receiving the uplink grant and within the transmission time interval, signaling that indicates one or more subbands of the subset associated with an LBT procedure of a second type, and perform LBT procedures of the first type or the second type on the subset of the set of subbands based on the uplink grant and the signaling. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, the communications manager 615 may be implemented as an integrated circuit or chipset for a mobile device modem, and the receiver 610 and transmitter 620 may be implemented as analog components (e.g., amplifiers, filters, antennas) coupled with the mobile device modem to enable wireless transmission and reception over one or more bands.

The communications manager 615 as described herein may be implemented to realize one or more potential advantages. One implementation may allow the device 605 to determine LBT procedures to perform on one or more subbands in an unlicensed spectrum. Based on the techniques for LBT, the device 605 may determine which type of LBT to perform for each of multiple subbands and, therefore, may perform more accurate LBT procedures for each subband.

As such, the device 605 may increase the likelihood of accurately sensing the occupancy of a channel and, accordingly, may communicate over the channel with a greater likelihood of successful communications. In some examples, based on a greater likelihood of successful communications and the type of LBT procedure to be performed, the device 605 may more efficiently power a processor or one or more processing units associated with an LBT procedure and transmitting and receiving communications, which may enable the device to save power and increase battery life.

Figure 7:
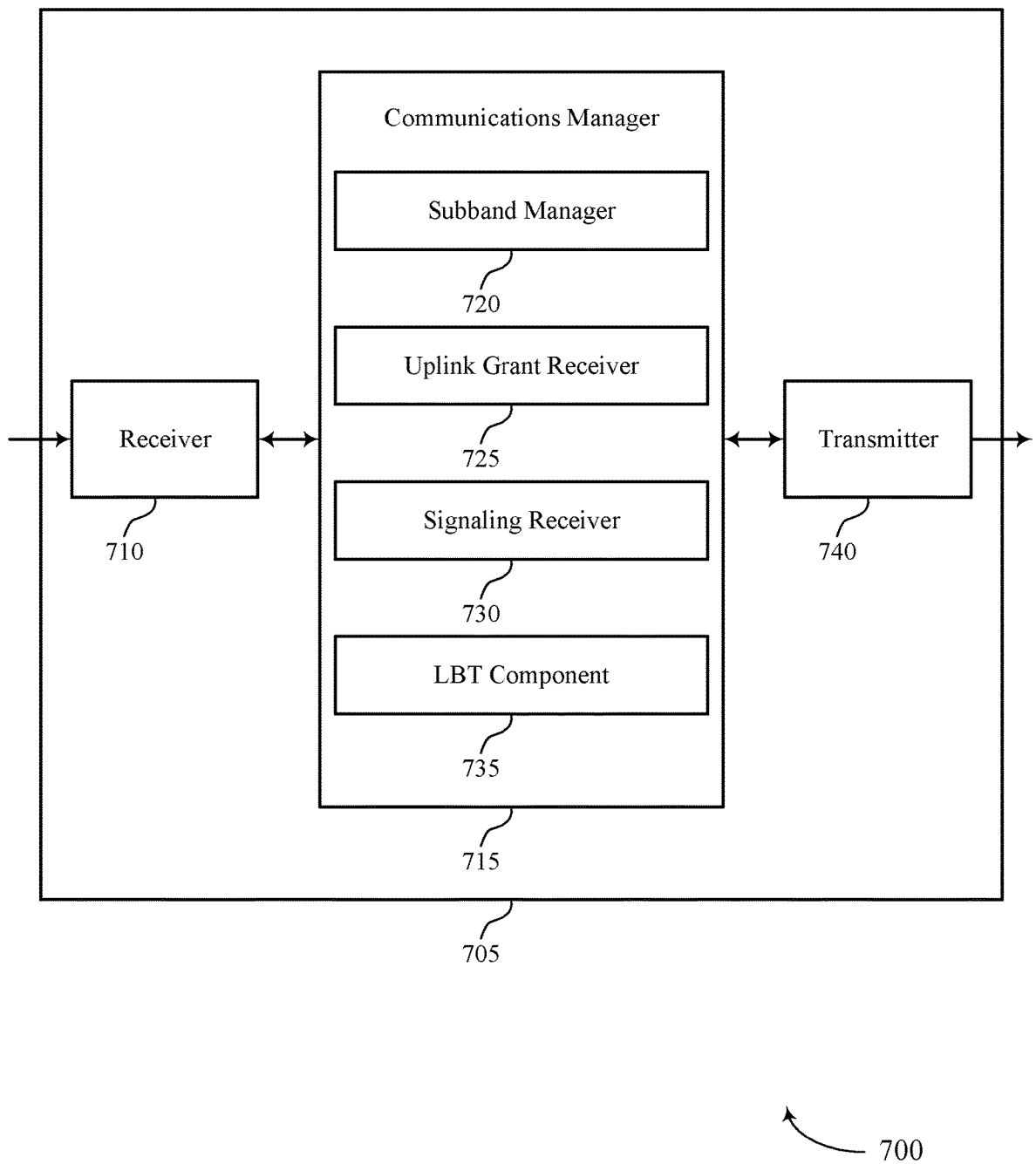

FIG. 7 shows a block diagram 700 of a device 705 that supports LBT for uplink transmissions using multiple subbands in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to LBT for uplink transmissions using multiple subbands, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a subband manager 720, an uplink grant receiver 725, a signaling receiver 730, and an LBT component 735. The communications manager 715 may be an example of aspects of the communications manager 910 described herein.

The subband manager 720 may identify a set of subbands supported by a base station in communication with the UE.

The uplink grant receiver 725 may receive an uplink grant for transmission of an uplink shared data channel via a subset of the set of subbands in a transmission time interval, the uplink grant indicating an LBT procedure of a first type for the subset of the set of subbands in the transmission time interval.

The signaling receiver 730 may receive, after receiving the uplink grant and within the transmission time interval, signaling that indicates one or more subbands of the subset associated with an LBT procedure of a second type.

The LBT component 735 may perform LBT procedures of the first type or the second type on the subset of the set of subbands based on the uplink grant and the signaling.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
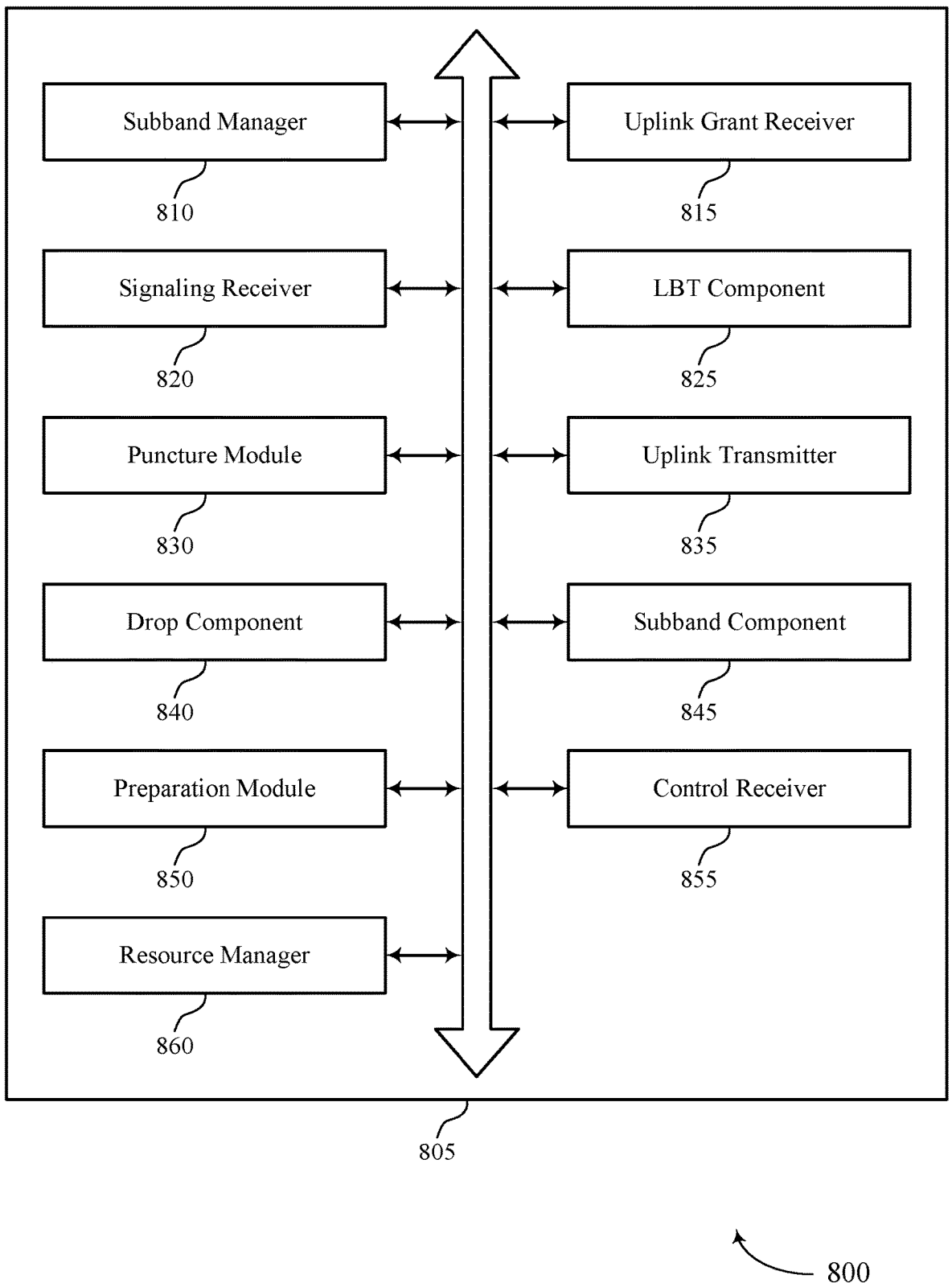
FIG. 8 shows a block diagram of a communications manager that supports LBT for uplink transmissions using multiple subbands in accordance with aspects of the present disclosure.

FIG. 8 shows a block diagram 800 of a communications manager 805 that supports LBT for uplink transmissions using multiple subbands in accordance with aspects of the present disclosure. The communications manager 805 may be an example of aspects of a communications manager 615, a communications manager 715, or a communications manager 910 described herein. The communications manager 805 may include a subband manager 810, an uplink grant receiver 815, a signaling receiver 820, an LBT component 825, a puncture module 830, an uplink transmitter 835, a drop component 840, a subband component 845, a preparation module 850, a control receiver 855, and a resource manager 860. Each of these modules may communicate, directly or indirectly, with one another (e.g., via one or more buses).

The subband manager 810 may identify a set of subbands supported by a base station in communication with the UE.

The uplink grant receiver 815 may receive an uplink grant for transmission of an uplink shared data channel via a subset of the set of subbands in a transmission time interval, the uplink grant indicating an LBT procedure of a first type for the subset of the set of subbands in the transmission time interval.

In some examples, receiving multiple uplink grants via respective subbands of the subset of the set of subbands, where each of the multiple uplink grants includes resource allocation information for the uplink shared data channel.

In some cases, each of the multiple uplink grants includes the same resource allocation information for the uplink shared data channel via the respective subbands.

In some cases, each of the multiple uplink grants includes different resource allocation information for the uplink shared data channel.

In some cases, the uplink grant includes a confidence indicator that indicates puncturing information for the subset of the set of subbands.

In some cases, the confidence indicator indicates which of the subset of the set of subbands is available for the uplink shared data channel.

The signaling receiver 820 may receive, after receiving the uplink grant and within the transmission time interval, signaling that indicates one or more subbands of the subset associated with an LBT procedure of a second type.

In some examples, the signaling receiver 820 may receive the signaling after a threshold time for preparation of the uplink shared data channel.

The LBT component 825 may perform LBT procedures of the first type or the second type on the subset of the set of subbands based on the uplink grant and the signaling.

In some examples, the LBT component 825 may perform LBT procedures of the second type on the one or more subbands of the subset based on the signaling.

In some examples, the LBT component 825 may perform LBT procedures of the first type on a first subband of the subset based on the uplink grant.

In some examples, the LBT component 825 may perform LBT procedures of the second type on a second subband of the subset based on the signaling.

In some examples, the LBT component 825 may perform LBT procedures of the first type on the subset of the set of subbands based on the uplink grant and a capability of the UE.

In some cases, the LBT procedure of the first type includes a category 4 LBT procedure.

In some cases, the LBT procedure of the second type includes a category 2 LBT procedure.

The puncture module 830 may puncture the uplink shared data channel on at least one subband based on an unsuccessful LBT procedure for the at least one subband.

In some examples, the puncture module 830 may puncture the uplink shared data channel on the one or more subbands based on the signaling being received after preparing the uplink shared data channel for transmission.

In some examples, the puncture module 830 may puncture the uplink shared data channel via the one or more subbands indicated by the signaling.

The uplink transmitter 835 may transmit the uplink shared data channel via the subset of the set of subbands excluding the at least one subband based on the puncturing.

In some examples, the uplink transmitter 835 may transmit the uplink shared data channel via each of the one or more subbands associated with a successful LBT procedure of the second type.

In some examples, the uplink transmitter 835 may transmit the uplink shared data channel via the one or more subbands if each of the one or more subbands is associated with a successful LBT procedure of the second type, where the uplink shared data channel is rate matched on the one or more subbands.

In some examples, the uplink transmitter 835 may transmit the uplink shared data channel via each of the first and second subbands associated with a successful LBT procedure.

In some examples, the uplink transmitter 835 may transmit the uplink shared data channel via the first and second subbands if the first and second subbands are associated with a successful LBT procedure.

In some examples, the uplink transmitter 835 may transmit the uplink shared data channel via each subband of the subset associated with a successful LBT procedure.

In some examples, the uplink transmitter 835 may transmit the uplink shared data channel via the subset of the set of subbands if each of the subset is associated with the successful LBT procedure.

In some examples, the uplink transmitter 835 may transmit the uplink shared data channel via the at least one subband, where the uplink shared data channel include UCI indicate the at least one subband used for transmission of the uplink shared data channel.

In some examples, the uplink transmitter 835 may transmit, based on the puncturing, the uplink shared data channel via the subset of the set of subbands associated with a successful LBT procedure and excluding the one or more subbands, where the uplink shared data channel includes UCI indicating the subset of the set of subbands associated with the successful LBT procedure.

In some examples, the uplink transmitter 835 may transmit the uplink shared data channel via each subband of the subset associated with a successful LBT procedure, where the uplink shared data channel includes UCI indicating each subband of the subset associated with the successful LBT procedure.

In some examples, the uplink transmitter 835 may transmit the prepared uplink shared data channel.

In some examples, the uplink transmitter 835 may transmit the uplink shared data channel irrespective of the signaling.

In some examples, the uplink transmitter 835 may transmit the uplink shared data channel via the subset of the set of subbands excluding the one or more subbands based on the puncturing.

In some cases, the UCI includes subbands over which a punctured uplink shared data channel is transmitted or subbands used for transmission of the uplink shared data channel.

The drop component 840 may drop the uplink shared data channel based on an unsuccessful LBT procedure on at least one subband of the subset.

In some examples, the drop component 840 may drop the uplink shared data channel based on the signaling.

The subband component 845 may determine at least one subband of the subset for transmission of the uplink shared data channel based on the multiple uplink grants, where the at least one subband corresponds to a subband over which one of the multiple uplink grants is received.

The preparation module 850 may prepare the uplink shared data channel for transmission to the base station via the subset of the set of subbands.

In some examples, the preparation module 850 may prepare the uplink shared data channel for transmission to the base station via the subset of the set of subbands associated with a successful LBT procedure based on the signaling, where the signaling is received before a threshold time for preparation of the uplink shared data channel.

The control receiver 855 may receive control information indicating to the UE to include UCI with the uplink shared data channel.

In some cases, the control information includes RRC information or DCI.

The resource manager 860 may determine a set of resources of each subband for the UCI, where the set of resources is based on one or more subbands of the subset subject to puncturing according to an unsuccessful LBT procedure.

In some examples, evenly distributing UCI across each subband, where the UCI includes information other than information indicating each subband of the subset associated with the successful LBT procedure.

In some examples, the resource manager 860 may determine a set of resources of each subband for the UCI based on a number of the subset of the set of subbands indicated in the uplink grant, a number of subbands used for transmission of the uplink shared data channel, a number of subbands associated with the LBT procedure of the second type, all of the set of subbands supported by the base station for communications with the UE, or any combination thereof.

In some examples, the resource manager 860 may multiplex UCI with the uplink shared data channel via at least one subband independent of a number of subbands used for transmission of the uplink shared data channel.

In some cases, a same number of symbols for the at least one subband is used for multiplexing the UCI irrespective of other subbands.

Figure 9:
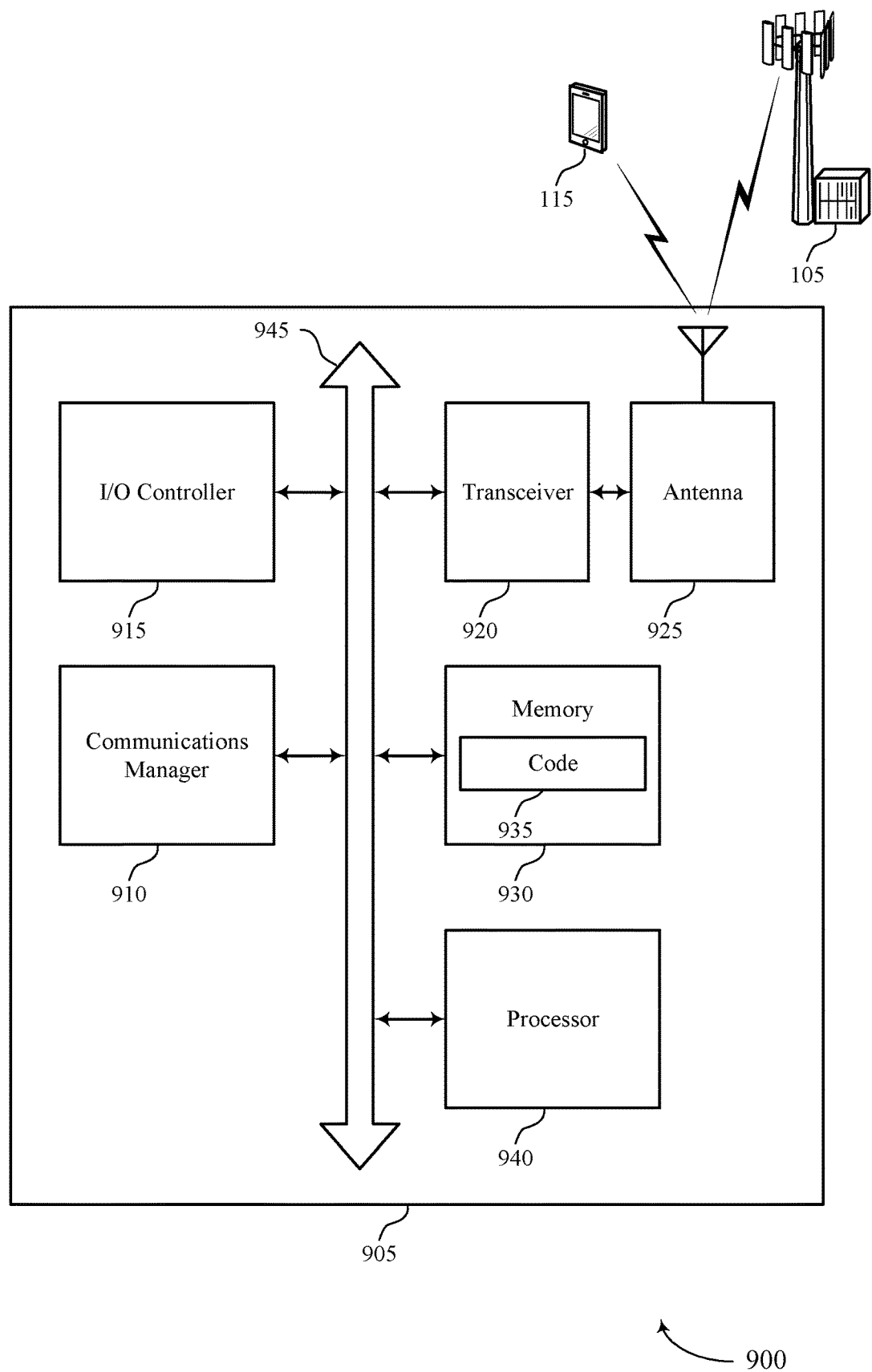
FIG. 9 shows a diagram of a system including a device that supports LBT for uplink transmissions using multiple subbands in accordance with aspects of the present disclosure.

FIG. 9 shows a diagram of a system 900 including a device 905 that supports LBT for uplink transmissions using multiple subbands in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify a set of subbands supported by a base station in communication with the UE, receive an uplink grant for transmission of an uplink shared data channel via a subset of the set of subbands in a transmission time interval, the uplink grant indicating an LBT procedure of a first type for the subset of the set of subbands in the transmission time interval, receive, after receiving the uplink grant and within the transmission time interval, signaling that indicates one or more subbands of the subset associated with an LBT procedure of a second type, and perform LBT procedures of the first type or the second type on the subset of the set of subbands based on the uplink grant and the signaling.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting LBT for uplink transmissions using multiple subbands).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
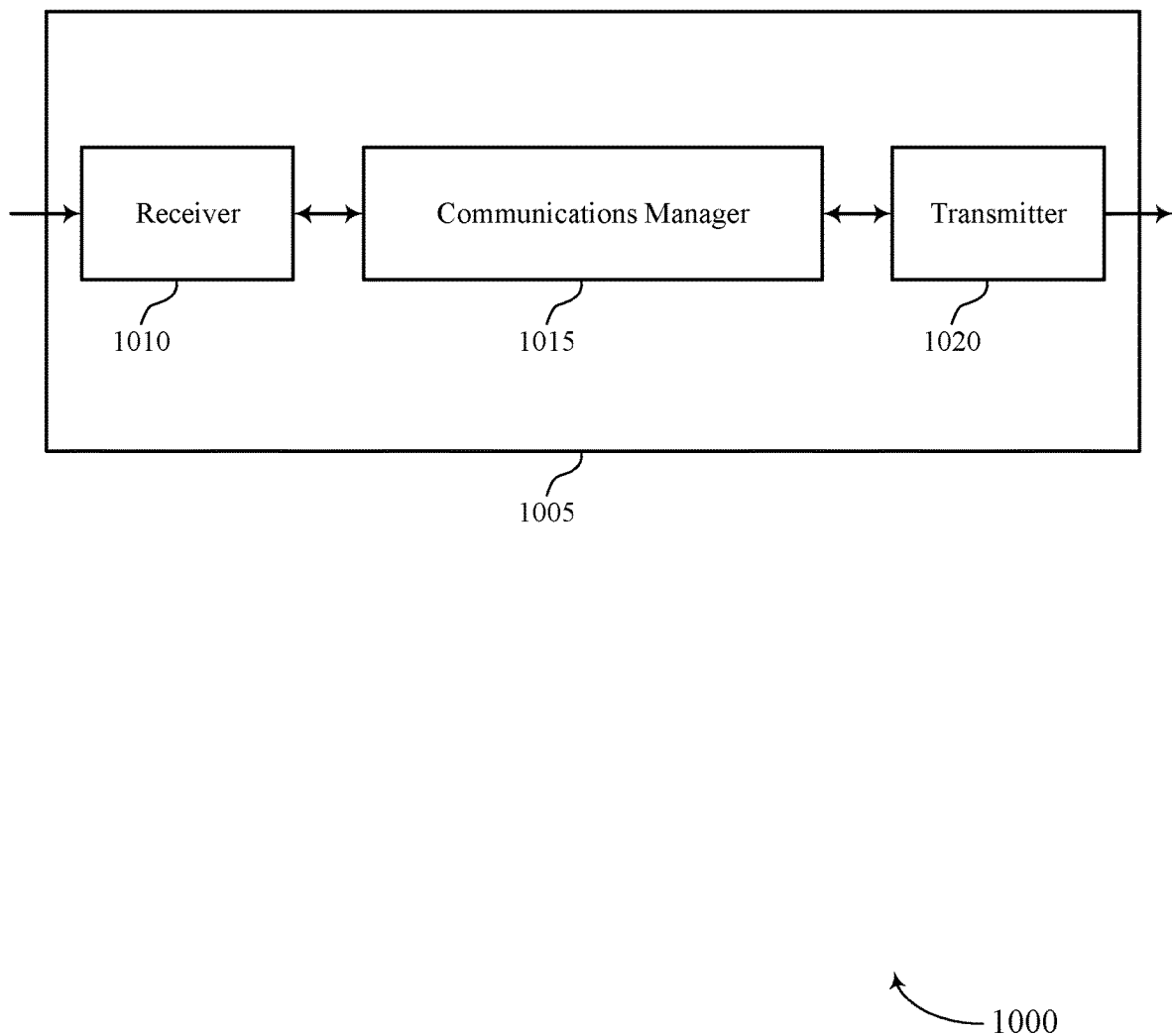
FIGS. 10 and 11 show block diagrams of devices that support LBT for uplink transmissions using multiple subbands in accordance with aspects of the present disclosure.

FIG. 10 shows a block diagram 1000 of a device 1005 that supports LBT for uplink transmissions using multiple subbands in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to LBT for uplink transmissions using multiple subbands, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a set of subbands supported by the base station in communication with a UE, transmit an uplink grant for an uplink shared data channel via a subset of the set of subbands in a transmission time interval, the uplink grant indicating an LBT procedure of the first type for the subset of the set of subbands in the transmission time interval, perform an LBT procedure for each of the subset of the set of subbands, and transmit, after transmitting the uplink grant and within the transmission time interval, signaling that indicates one or more subbands of the subset associated with an LBT procedure of a second type based on performing the LBT procedure. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
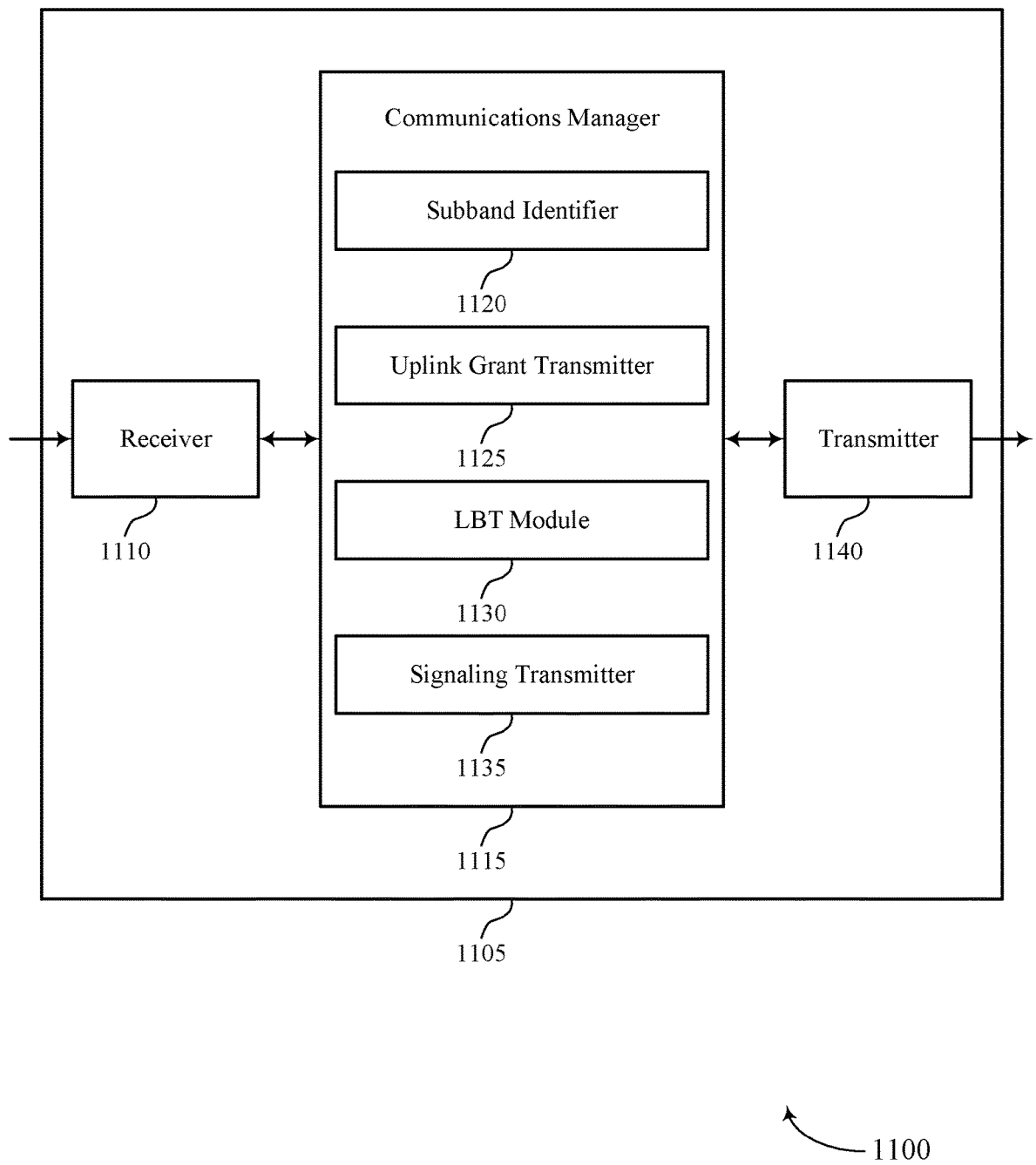

FIG. 11 shows a block diagram 1100 of a device 1105 that supports LBT for uplink transmissions using multiple subbands in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to LBT for uplink transmissions using multiple subbands, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a subband identifier 1120, an uplink grant transmitter 1125, an LBT module 1130, and a signaling transmitter 1135. The communications manager 1115 may be an example of aspects of the communications manager 1310 described herein.

The subband identifier 1120 may identify a set of subbands supported by the base station in communication with a UE.

The uplink grant transmitter 1125 may transmit an uplink grant for an uplink shared data channel via a subset of the set of subbands in a transmission time interval, the uplink grant indicating an LBT procedure of the first type for the subset of the set of subbands in the transmission time interval.

The LBT module 1130 may perform an LBT procedure for each of the subset of the set of subbands.

The signaling transmitter 1135 may transmit, after transmitting the uplink grant and within the transmission time interval, signaling that indicates one or more subbands of the subset associated with an LBT procedure of a second type based on performing the LBT procedure.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
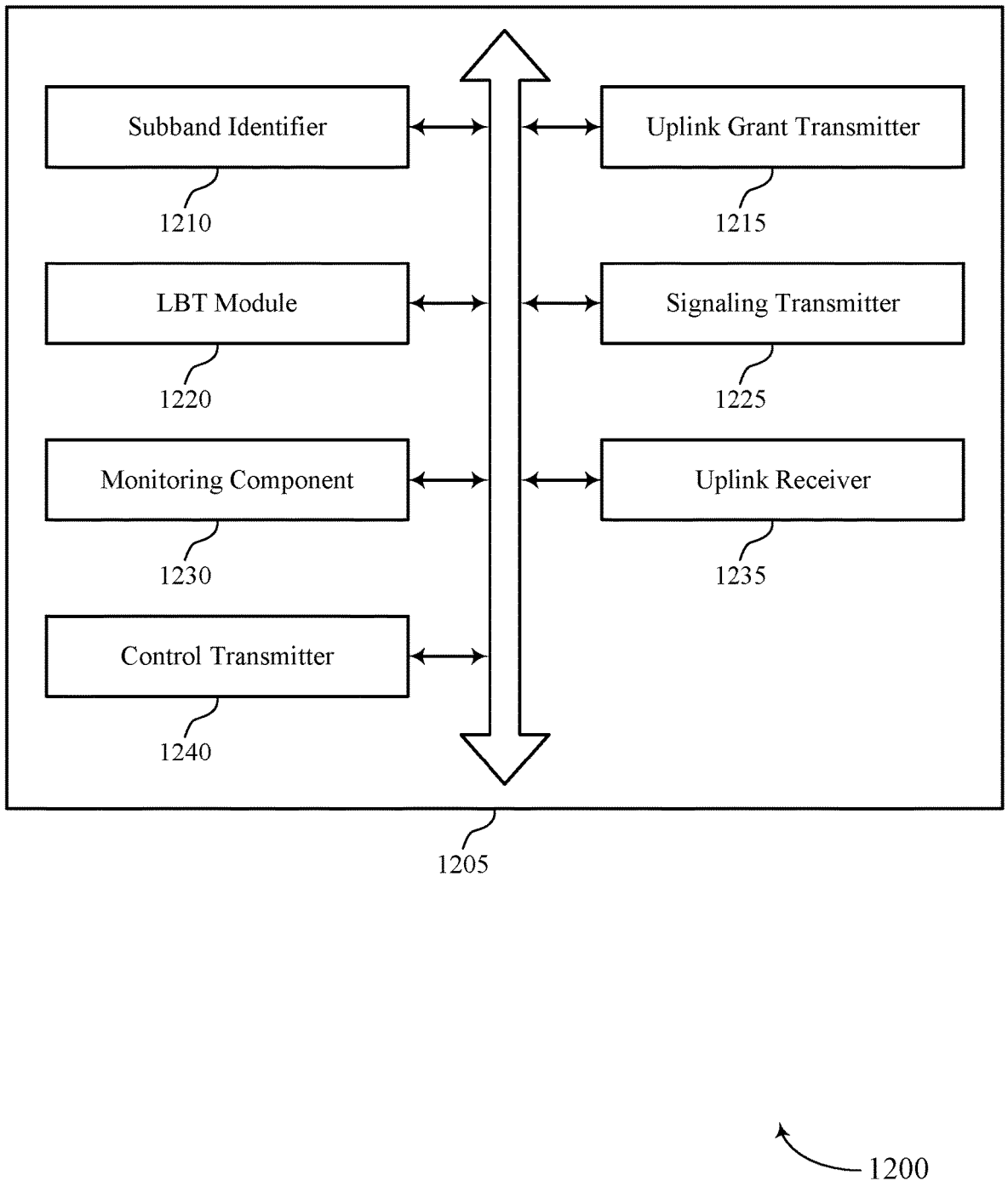
FIG. 12 shows a block diagram of a communications manager that supports LBT for uplink transmissions using multiple subbands in accordance with aspects of the present disclosure.

FIG. 12 shows a block diagram 1200 of a communications manager 1205 that supports LBT for uplink transmissions using multiple subbands in accordance with aspects of the present disclosure. The communications manager 1205 may be an example of aspects of a communications manager 1015, a communications manager 1115, or a communications manager 1310 described herein. The communications manager 1205 may include a subband identifier 1210, an uplink grant transmitter 1215, an LBT module 1220, a signaling transmitter 1225, a monitoring component 1230, an uplink receiver 1235, and a control transmitter 1240. Each of these modules may communicate, directly or indirectly, with one another (e.g., via one or more buses).

The subband identifier 1210 may identify a set of subbands supported by the base station in communication with a UE.

The uplink grant transmitter 1215 may transmit an uplink grant for an uplink shared data channel via a subset of the set of subbands in a transmission time interval, the uplink grant indicating an LBT procedure of the first type for the subset of the set of subbands in the transmission time interval.

In some examples, transmitting multiple uplink grants via respective subbands of the subset of the set of subbands, where each of the multiple uplink grants includes resource allocation information for the uplink shared data channel.

In some cases, each of the multiple uplink grants includes the same resource allocation information for the uplink shared data channel via the respective subbands.

In some cases, each of the multiple uplink grants includes different resource allocation information for the uplink shared data channel.

The LBT module 1220 may perform an LBT procedure for each of the subset of the set of subbands.

The signaling transmitter 1225 may transmit, after transmitting the uplink grant and within the transmission time interval, signaling that indicates one or more subbands of the subset associated with an LBT procedure of a second type based on performing the LBT procedure.

The monitoring component 1230 may monitor each subband of the subset for the uplink shared data channel from the UE after transmitting the signaling.

In some examples, the monitoring component 1230 may monitor multiple hypothesis for UCI from the UE based on the UE and the base station being out of sync.

The uplink receiver 1235 may receive the uplink shared data channel via at least one subband of the subset, the uplink shared data channel including UCI that indicates subbands of the subset over which the uplink shared data channel is transmitted or punctured.

In some cases, the UCI includes subbands over which a punctured uplink shared data channel is transmitted or subbands used for transmission of the uplink shared data channel.

The control transmitter 1240 may transmit control information to the UE that indicates to the UE to include UCI with the uplink shared data channel.

In some cases, the control information includes RRC information or DCI.

Figure 13:
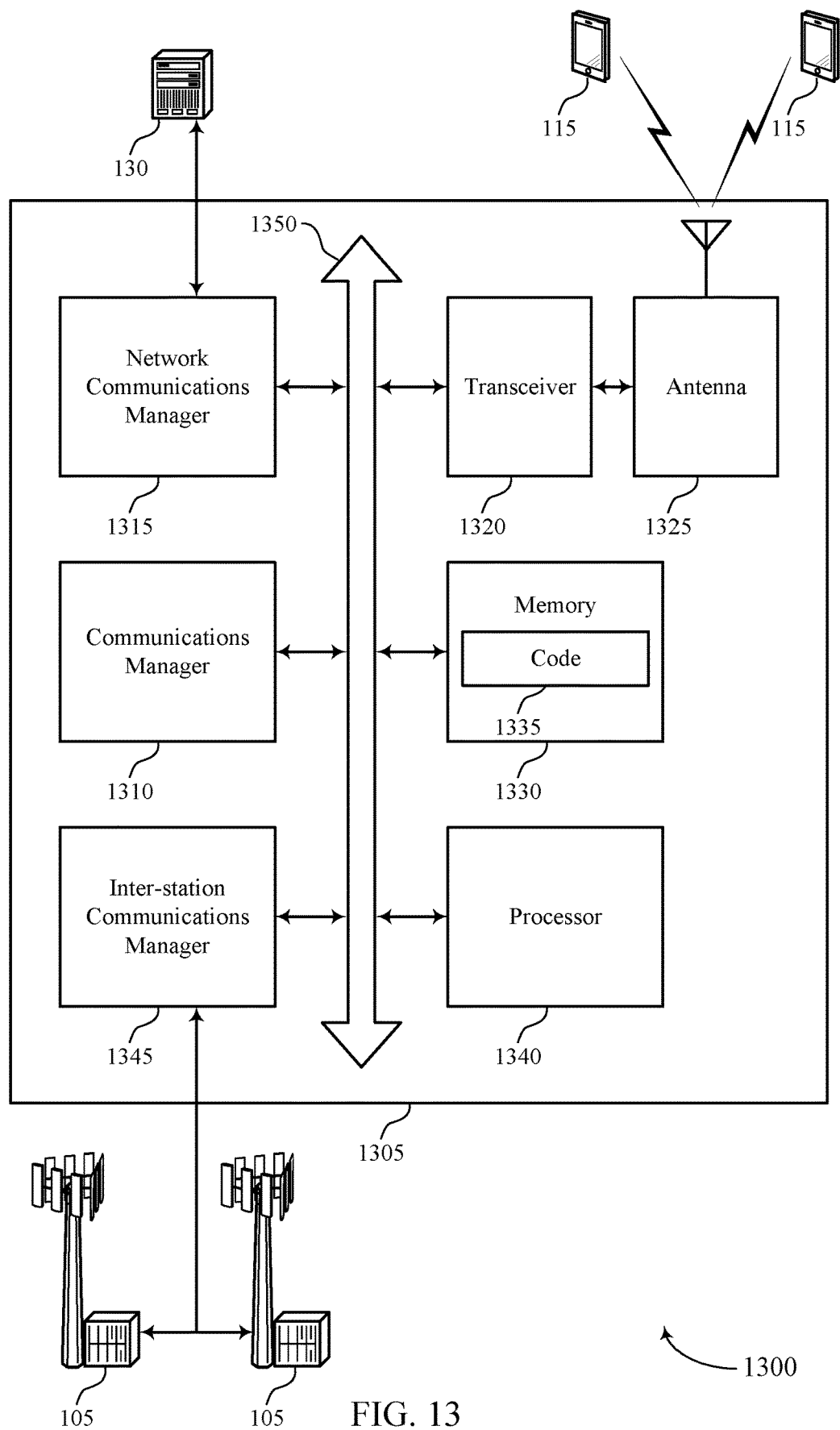
FIG. 13 shows a diagram of a system including a device that supports LBT for uplink transmissions using multiple subbands in accordance with aspects of the present disclosure.

FIG. 13 shows a diagram of a system 1300 including a device 1305 that supports LBT for uplink transmissions using multiple subbands in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a set of subbands supported by the base station in communication with a UE, transmit an uplink grant for an uplink shared data channel via a subset of the set of subbands in a transmission time interval, the uplink grant indicating an LBT procedure of the first type for the subset of the set of subbands in the transmission time interval, perform an LBT procedure for each of the subset of the set of subbands, and transmit, after transmitting the uplink grant and within the transmission time interval, signaling that indicates one or more subbands of the subset associated with an LBT procedure of a second type based on performing the LBT procedure.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting LBT for uplink transmissions using multiple subbands).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
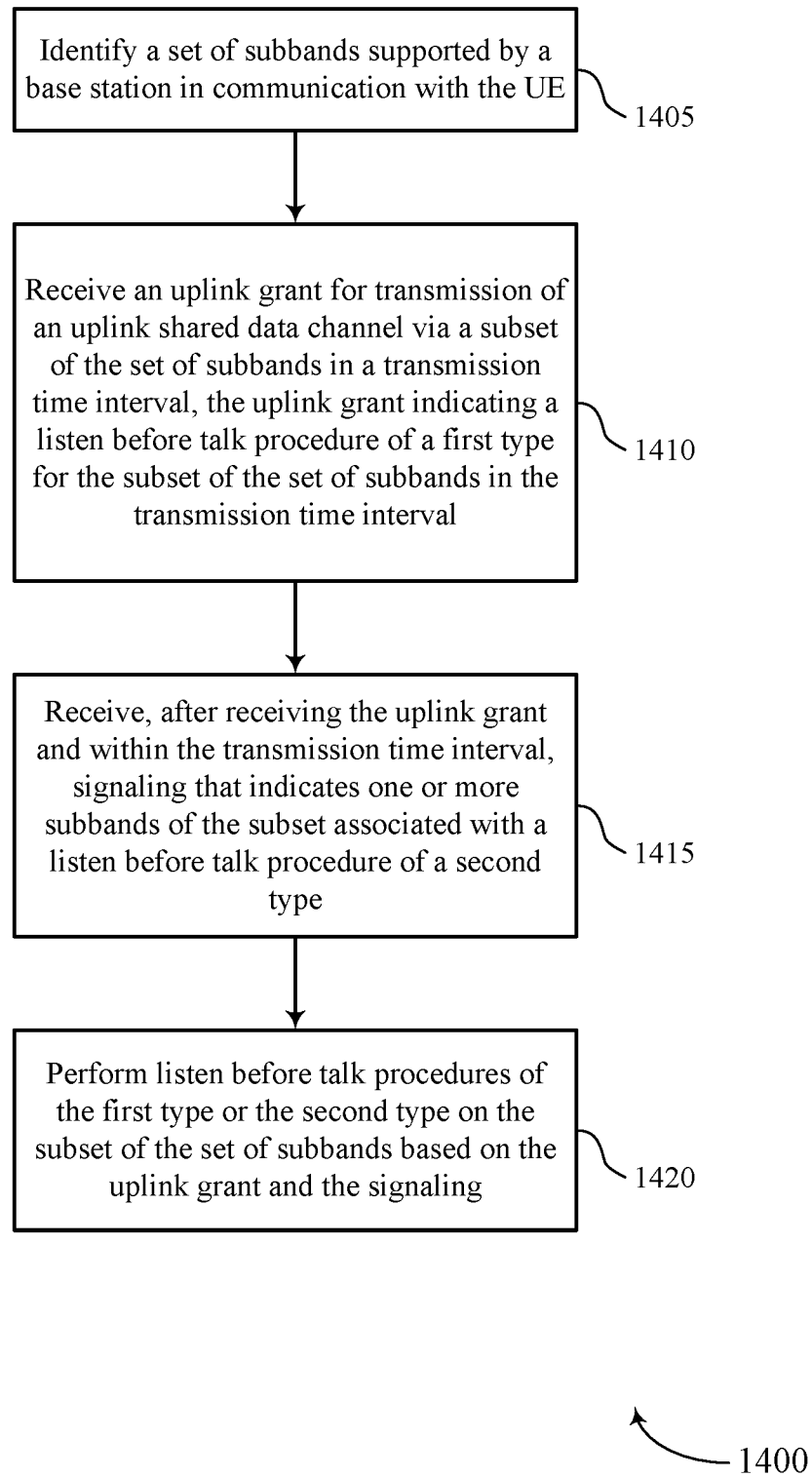
FIGS. 14 through 18 show flowcharts illustrating methods that support LBT for uplink transmissions using multiple subbands in accordance with aspects of the present disclosure.

FIG. 14 shows a flowchart illustrating a method 1400 that supports LBT for uplink transmissions using multiple subbands in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may identify a set of subbands supported by a base station in communication with the UE. The operations of 1405 may be performed according to the methods described herein. In some examples, aspects of the operations of 1405 may be performed by a subband manager as described with reference to FIGS. 6 through 9.

At 1410, the UE may receive an uplink grant for transmission of an uplink shared data channel via a subset of the set of subbands in a transmission time interval, the uplink grant indicating an LBT procedure of a first type for the subset of the set of subbands in the transmission time interval. The operations of 1410 may be performed according to the methods described herein. In some examples, aspects of the operations of 1410 may be performed by an uplink grant receiver as described with reference to FIGS. 6 through 9.

At 1415, the UE may receive, after receiving the uplink grant and within the transmission time interval, signaling that indicates one or more subbands of the subset associated with an LBT procedure of a second type. The operations of 1415 may be performed according to the methods described herein. In some examples, aspects of the operations of 1415 may be performed by a signaling receiver as described with reference to FIGS. 6 through 9.

At 1420, the UE may perform LBT procedures of the first type or the second type on the subset of the set of subbands based on the uplink grant and the signaling. The operations of 1420 may be performed according to the methods described herein. In some examples, aspects of the operations of 1420 may be performed by an LBT component as described with reference to FIGS. 6 through 9.

Figure 15:
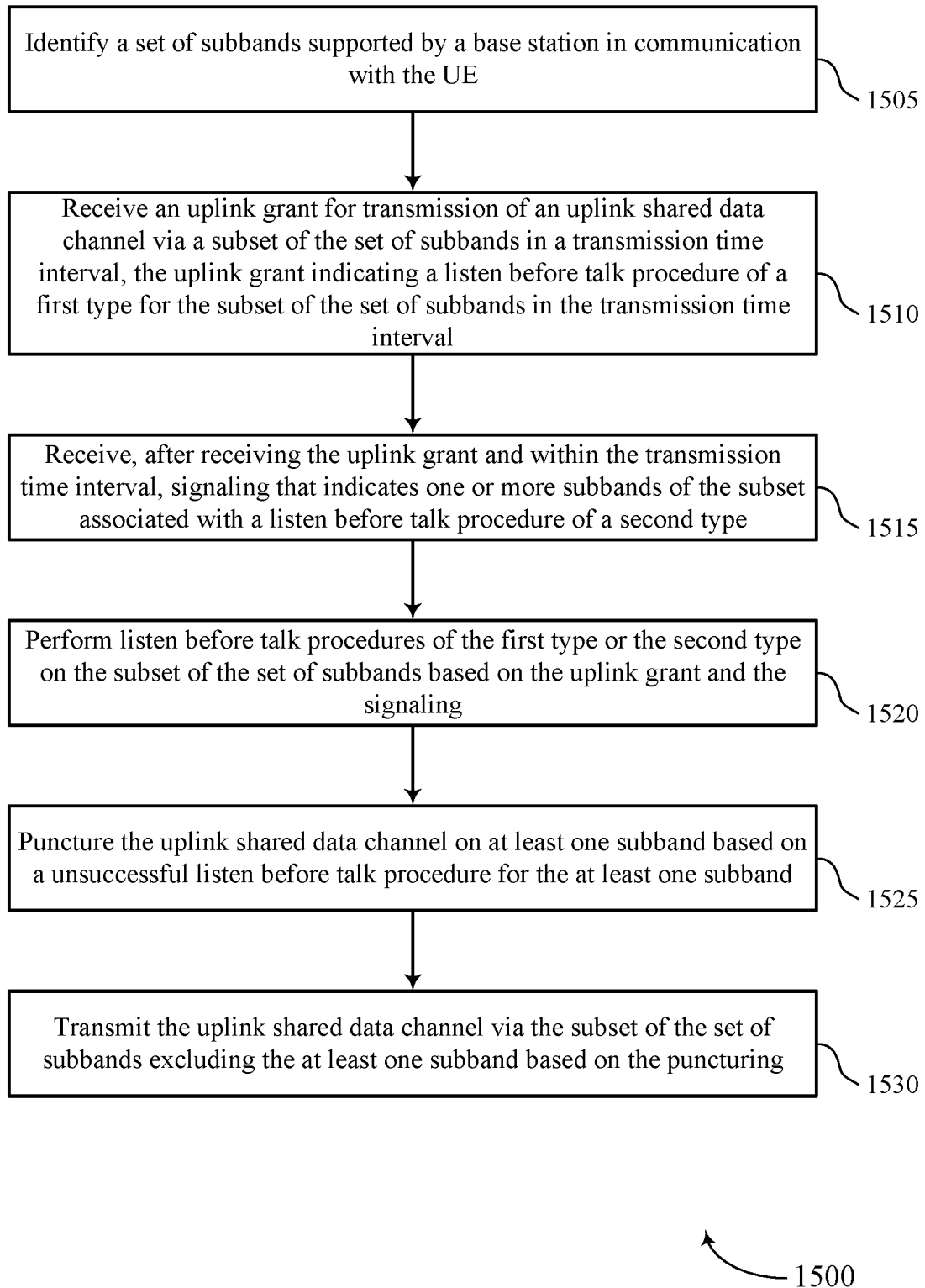

FIG. 15 shows a flowchart illustrating a method 1500 that supports LBT for uplink transmissions using multiple subbands in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may identify a set of subbands supported by a base station in communication with the UE. The operations of 1505 may be performed according to the methods described herein. In some examples, aspects of the operations of 1505 may be performed by a subband manager as described with reference to FIGS. 6 through 9.

At 1510, the UE may receive an uplink grant for transmission of an uplink shared data channel via a subset of the set of subbands in a transmission time interval, the uplink grant indicating an LBT procedure of a first type for the subset of the set of subbands in the transmission time interval. The operations of 1510 may be performed according to the methods described herein. In some examples, aspects of the operations of 1510 may be performed by an uplink grant receiver as described with reference to FIGS. 6 through 9.

At 1515, the UE may receive, after receiving the uplink grant and within the transmission time interval, signaling that indicates one or more subbands of the subset associated with an LBT procedure of a second type. The operations of 1515 may be performed according to the methods described herein. In some examples, aspects of the operations of 1515 may be performed by a signaling receiver as described with reference to FIGS. 6 through 9.

At 1520, the UE may perform LBT procedures of the first type or the second type on the subset of the set of subbands based on the uplink grant and the signaling. The operations of 1520 may be performed according to the methods described herein. In some examples, aspects of the operations of 1520 may be performed by an LBT component as described with reference to FIGS. 6 through 9.

At 1525, the UE may puncture the uplink shared data channel on at least one subband based on an unsuccessful LBT procedure for the at least one subband. The operations of 1525 may be performed according to the methods described herein. In some examples, aspects of the operations of 1525 may be performed by a puncture module as described with reference to FIGS. 6 through 9.

At 1530, the UE may transmit the uplink shared data channel via the subset of the set of subbands excluding the at least one subband based on the puncturing. The operations of 1530 may be performed according to the methods described herein. In some examples, aspects of the operations of 1530 may be performed by an uplink transmitter as described with reference to FIGS. 6 through 9.

Figure 16:
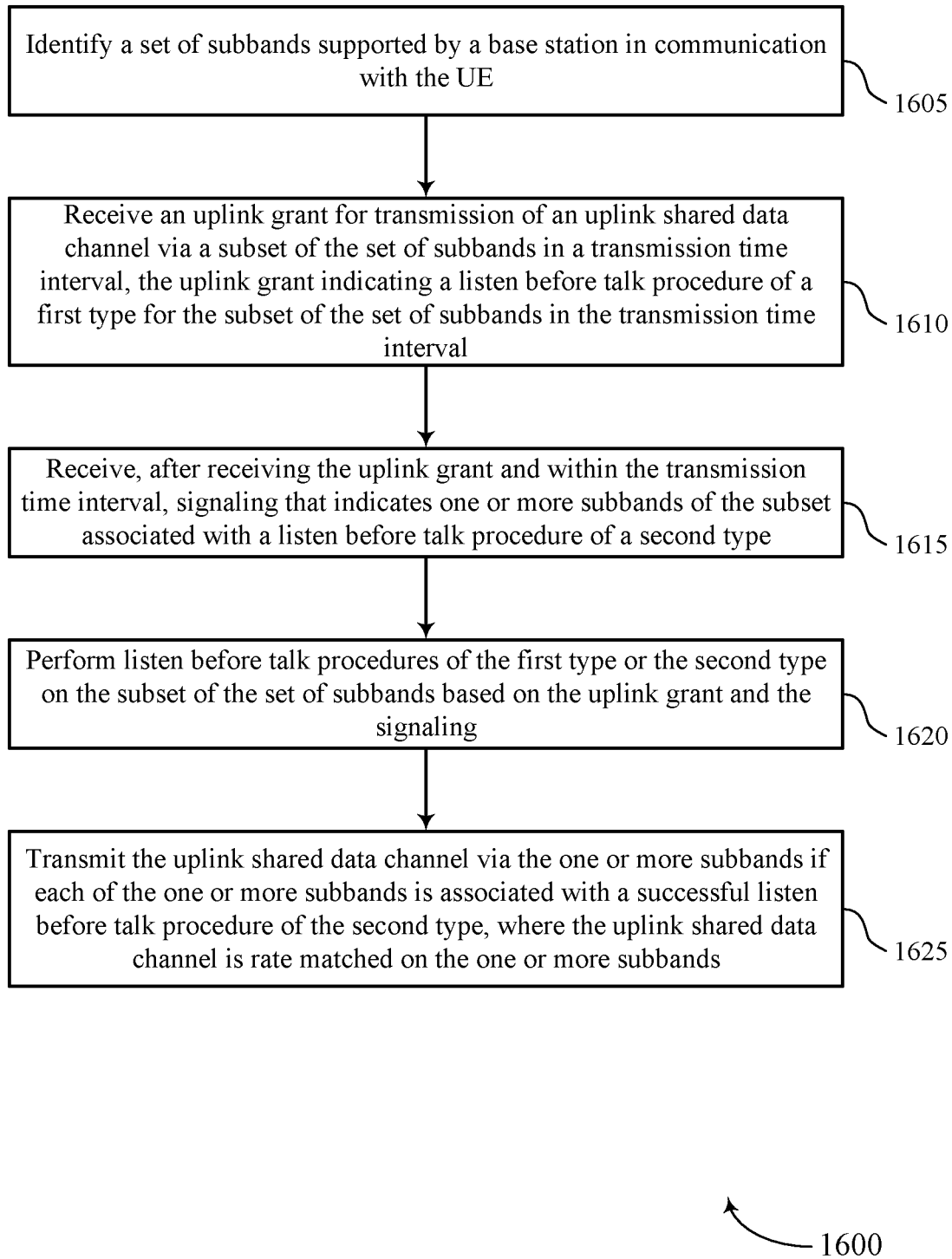

FIG. 16 shows a flowchart illustrating a method 1600 that supports LBT for uplink transmissions using multiple subbands in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1605, the UE may identify a set of subbands supported by a base station in communication with the UE. The operations of 1605 may be performed according to the methods described herein. In some examples, aspects of the operations of 1605 may be performed by a subband manager as described with reference to FIGS. 6 through 9.

At 1610, the UE may receive an uplink grant for transmission of an uplink shared data channel via a subset of the set of subbands in a transmission time interval, the uplink grant indicating an LBT procedure of a first type for the subset of the set of subbands in the transmission time interval. The operations of 1610 may be performed according to the methods described herein. In some examples, aspects of the operations of 1610 may be performed by an uplink grant receiver as described with reference to FIGS. 6 through 9.

At 1615, the UE may receive, after receiving the uplink grant and within the transmission time interval, signaling that indicates one or more subbands of the subset associated with an LBT procedure of a second type. The operations of 1615 may be performed according to the methods described herein. In some examples, aspects of the operations of 1615 may be performed by a signaling receiver as described with reference to FIGS. 6 through 9.

At 1620, the UE may perform LBT procedures of the first type or the second type on the subset of the set of subbands based on the uplink grant and the signaling. The operations of 1620 may be performed according to the methods described herein. In some examples, aspects of the operations of 1620 may be performed by an LBT component as described with reference to FIGS. 6 through 9.

At 1625, the UE may transmit the uplink shared data channel via the one or more subbands if each of the one or more subbands is associated with a successful LBT procedure of the second type, where the uplink shared data channel is rate matched on the one or more subbands. The operations of 1625 may be performed according to the methods described herein. In some examples, aspects of the operations of 1625 may be performed by an uplink transmitter as described with reference to FIGS. 6 through 9.

Figure 17:
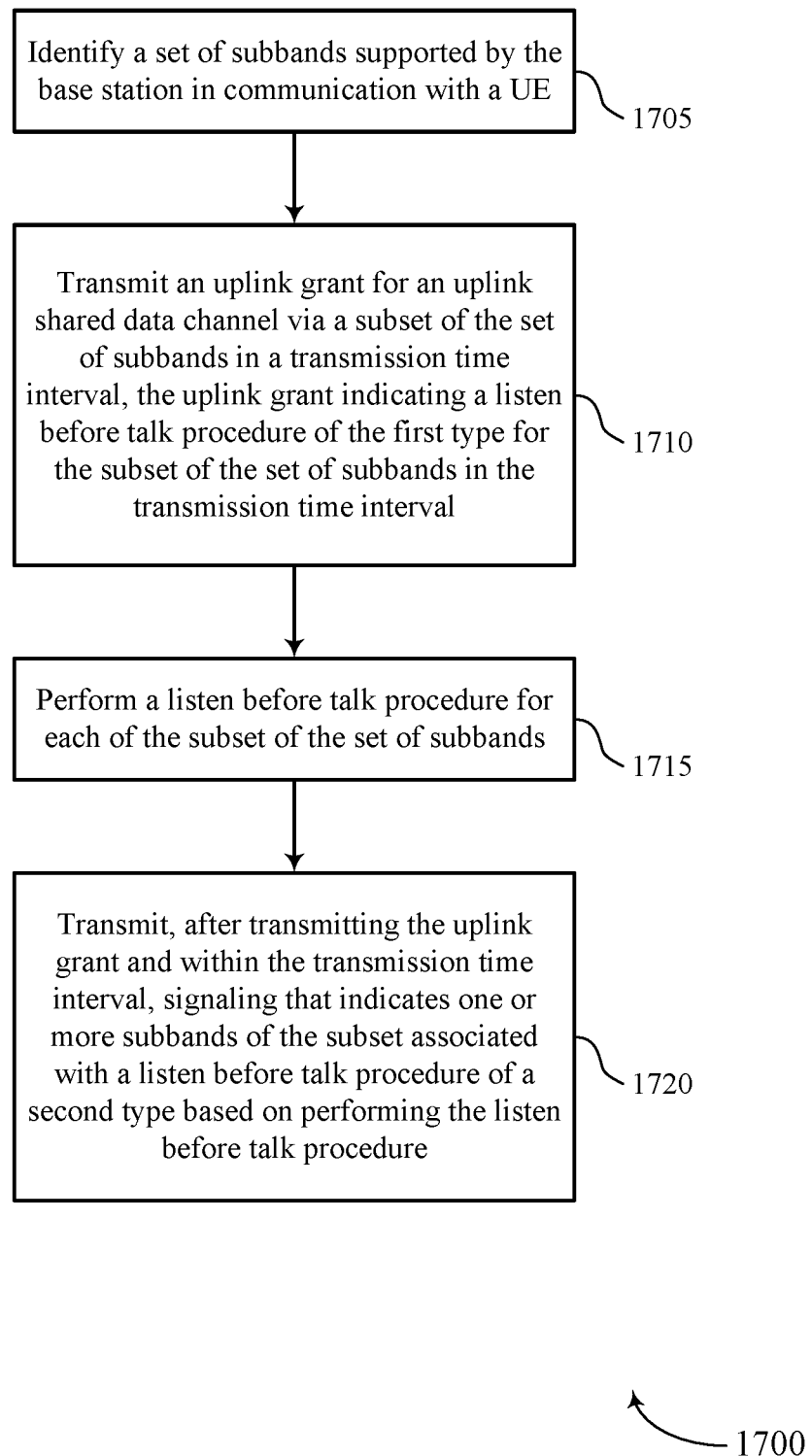

FIG. 17 shows a flowchart illustrating a method 1700 that supports LBT for uplink transmissions using multiple subbands in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may identify a set of subbands supported by the base station in communication with a UE. The operations of 1705 may be performed according to the methods described herein. In some examples, aspects of the operations of 1705 may be performed by a subband identifier as described with reference to FIGS. 10 through 13.

At 1710, the base station may transmit an uplink grant for an uplink shared data channel via a subset of the set of subbands in a transmission time interval, the uplink grant indicating an LBT procedure of the first type for the subset of the set of subbands in the transmission time interval. The operations of 1710 may be performed according to the methods described herein. In some examples, aspects of the operations of 1710 may be performed by an uplink grant transmitter as described with reference to FIGS. 10 through 13.

At 1715, the base station may perform an LBT procedure for each of the subset of the set of subbands. The operations of 1715 may be performed according to the methods described herein. In some examples, aspects of the operations of 1715 may be performed by an LBT module as described with reference to FIGS. 10 through 13.

At 1720, the base station may transmit, after transmitting the uplink grant and within the transmission time interval, signaling that indicates one or more subbands of the subset associated with an LBT procedure of a second type based on performing the LBT procedure. The operations of 1720 may be performed according to the methods described herein. In some examples, aspects of the operations of 1720 may be performed by a signaling transmitter as described with reference to FIGS. 10 through 13.

Figure 18:
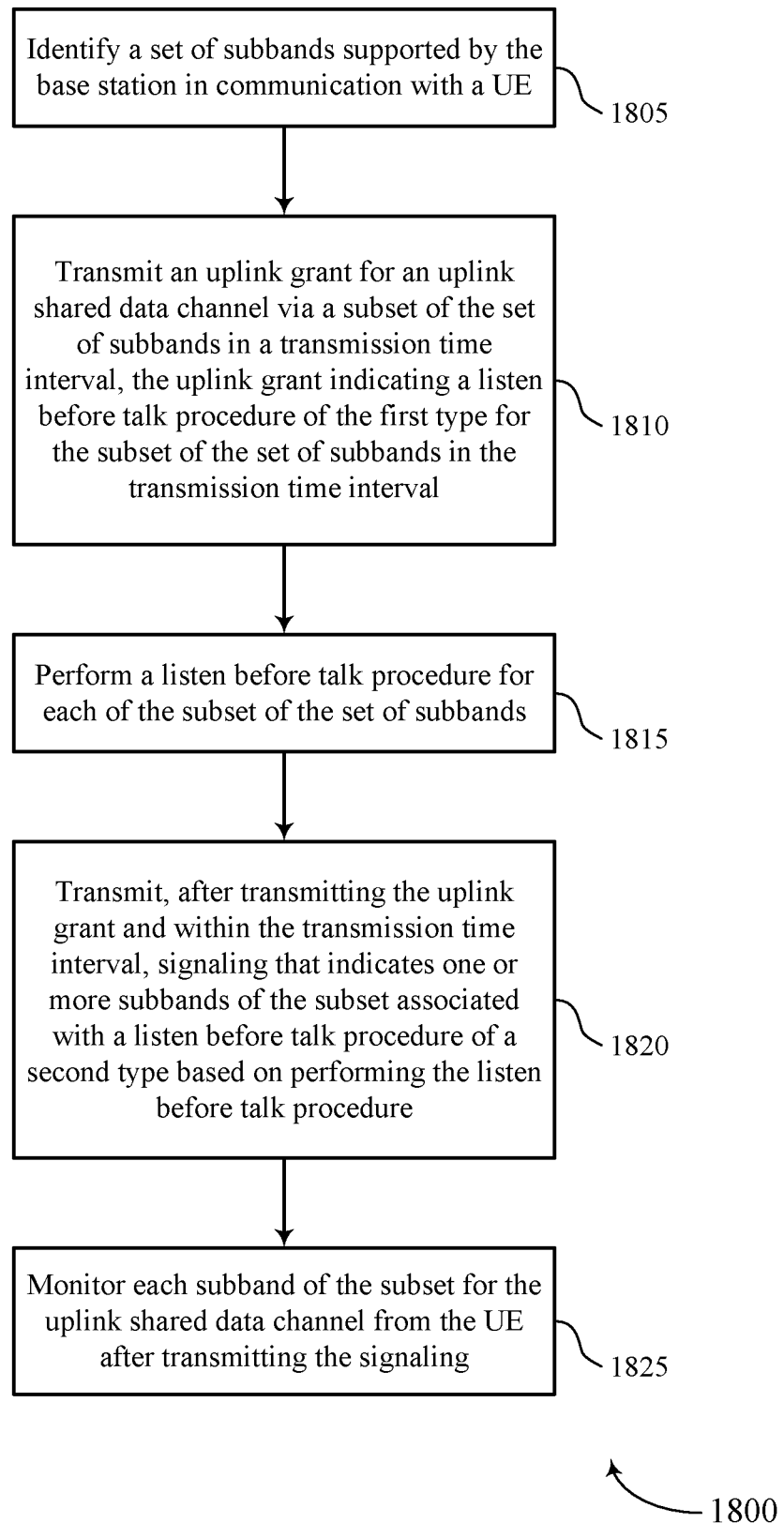

FIG. 18 shows a flowchart illustrating a method 1800 that supports LBT for uplink transmissions using multiple subbands in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1805, the base station may identify a set of subbands supported by the base station in communication with a UE. The operations of 1805 may be performed according to the methods described herein. In some examples, aspects of the operations of 1805 may be performed by a subband identifier as described with reference to FIGS. 10 through 13.

At 1810, the base station may transmit an uplink grant for an uplink shared data channel via a subset of the set of subbands in a transmission time interval, the uplink grant indicating an LBT procedure of the first type for the subset of the set of subbands in the transmission time interval. The operations of 1810 may be performed according to the methods described herein. In some examples, aspects of the operations of 1810 may be performed by an uplink grant transmitter as described with reference to FIGS. 10 through 13.

At 1815, the base station may perform an LBT procedure for each of the subset of the set of subbands. The operations of 1815 may be performed according to the methods described herein. In some examples, aspects of the operations of 1815 may be performed by an LBT module as described with reference to FIGS. 10 through 13.

At 1820, the base station may transmit, after transmitting the uplink grant and within the transmission time interval, signaling that indicates one or more subbands of the subset associated with an LBT procedure of a second type based on performing the LBT procedure. The operations of 1820 may be performed according to the methods described herein. In some examples, aspects of the operations of 1820 may be performed by a signaling transmitter as described with reference to FIGS. 10 through 13.

At 1825, the base station may monitor each subband of the subset for the uplink shared data channel from the UE after transmitting the signaling. The operations of 1825 may be performed according to the methods described herein. In some examples, aspects of the operations of 1825 may be performed by a monitoring component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   identifying a subset of subbands supported by a base station in communication with the UE;
   receiving an uplink grant for transmission of an uplink shared data channel via the subset of subbands in a transmission time interval, the uplink grant indicating a listen before talk (LBT) procedure of a first type for the subset of subbands in the transmission time interval;
   receiving, after receiving the uplink grant and within the transmission time interval, signaling that indicates one or more subbands of the subset associated with an LBT procedure of a second type, wherein the LBT procedure of the second type for the one or more subbands is different than the LBT procedure of the first type for each subband of the subset of subbands indicated via the uplink grant; and
   performing LBT procedures of the first type or the second type on the subset of subbands based at least in part on the uplink grant and the signaling.

2. The method of claim 1, further comprising:
   puncturing the uplink shared data channel on at least one subband based at least in part on an unsuccessful LBT procedure for the at least one subband; and
   transmitting the uplink shared data channel via the subset of subbands excluding the at least one subband based at least in part on the puncturing.

3. The method of claim 1, further comprising:
   performing LBT procedures of the second type on the one or more subbands of the subset based at least in part on the signaling; and transmitting the uplink shared data channel via each of the one or more subbands associated with a successful LBT procedure of the second type.

4. The method of claim 1, further comprising:
transmitting the uplink shared data channel via the one or more subbands if each of the one or more subbands is associated with a successful LBT procedure of the second type, wherein the uplink shared data channel is rate matched on the one or more subbands.

5. The method of claim 1, further comprising:
performing LBT procedures of the first type on a first subband of the subset based at least in part on the uplink grant;
performing LBT procedures of the second type on a second subband of the subset based at least in part on the signaling; and
transmitting the uplink shared data channel via each of the first and second subbands associated with a successful LBT procedure.

6. The method of claim 1, further comprising:
performing LBT procedures of the first type on a first subband of the subset based at least in part on the uplink grant;
performing LBT procedures of the second type on a second subband of the subset based at least in part on the signaling; and
transmitting the uplink shared data channel via the first and second subbands if the first and second subbands are associated with a successful LBT procedure.

7. The method of claim 1, further comprising:
performing LBT procedures of the first type on the subset of subbands based at least in part on the uplink grant and a capability of the UE; and
transmitting the uplink shared data channel via each subband of the subset associated with a successful LBT procedure.

8. The method of claim 7, further comprising:
transmitting the uplink shared data channel via the subset of subbands if each of the subset is associated with the successful LBT procedure.

9. The method of claim 1, further comprising:
dropping the uplink shared data channel based at least in part on an unsuccessful LBT procedure on at least one subband of the subset.

10. The method of claim 1, further comprising:
receiving multiple uplink grants via respective subbands of the subset of subbands, wherein each of the multiple uplink grants comprises resource allocation information for the uplink shared data channel.

11. The method of claim 10, wherein each of the multiple uplink grants comprises the same resource allocation information for the uplink shared data channel via the respective subbands.

12. The method of claim 10, wherein each of the multiple uplink grants comprises different resource allocation information for the uplink shared data channel.

13. The method of claim 10, further comprising:
determining at least one subband of the subset for transmission of the uplink shared data channel based at least in part on the multiple uplink grants, wherein the at least one subband corresponds to a subband over which one of the multiple uplink grants is received; and
transmitting the uplink shared data channel via the at least one subband, wherein the uplink shared data channel includes uplink control information that indicates the at least one subband used for transmission of the uplink shared data channel.

14. The method of claim 1, wherein the uplink grant comprises a confidence indicator that indicates puncturing information for the subset of subbands and which of the subset of subbands is available for the uplink shared data channel.

15. The method of claim 1, further comprising:
preparing the uplink shared data channel for transmission to the base station via the subset of subbands;
puncturing the uplink shared data channel on the one or more subbands based at least in part on the signaling being received after preparing the uplink shared data channel for transmission; and
transmitting, based at least in part on the puncturing, the uplink shared data channel via the subset of subbands associated with a successful LBT procedure and excluding the one or more subbands, wherein the uplink shared data channel includes uplink control information indicating the subset of subbands associated with the successful LBT procedure.

16. The method of claim 15, further comprising:
receiving control information indicating to the UE to include uplink control information with the uplink shared data channel, wherein the control information comprises radio resource control (RRC) information or downlink control information (DCI).

17. The method of claim 15, wherein the uplink control information includes subbands over which a punctured uplink shared data channel is transmitted or subbands used for transmission of the uplink shared data channel.

18. The method of claim 1, further comprising:
transmitting the uplink shared data channel via each subband of the subset associated with a successful LBT procedure, wherein the uplink shared data channel includes uplink control information indicating each subband of the subset associated with the successful LBT procedure.

19. The method of claim 18, further comprising:
determining a set of resources of each subband for the uplink control information, wherein the set of resources is based at least in part on one or more subbands of the subset subject to puncturing according to an unsuccessful LBT procedure.

20. The method of claim 19, further comprising:
evenly distributing uplink control information across each subband, wherein the uplink control information comprises information other than information indicating each subband of the subset associated with the successful LBT procedure.

21. The method of claim 18, further comprising:
determining a set of resources of each subband for the uplink control information based at least in part on a number of the subset of subbands indicated in the uplink grant, a number of subbands used for transmission of the uplink shared data channel, a number of subbands associated with the LBT procedure of the second type, all of subbands supported by the base station for communications with the UE, or any combination thereof.

22. The method of claim 18, further comprising:
multiplexing uplink control information with the uplink shared data channel via at least one subband independent of a number of subbands used for transmission of the uplink shared data channel, wherein a same number of symbols for the at least one subband is used for multiplexing the uplink control information irrespective of other subbands.

23. The method of claim 1, further comprising:
preparing the uplink shared data channel for transmission to the base station via the subset of subbands associated with a successful LBT procedure based at least in part on the signaling, wherein the signaling is received before a threshold time for preparation of the uplink shared data channel; and
transmitting the prepared uplink shared data channel.

24. The method of claim 1, further comprising:
receiving the signaling after a threshold time for preparation of the uplink shared data channel; and
transmitting the uplink shared data channel irrespective of the signaling.

25. The method of claim 1, further comprising:
receiving the signaling after a threshold time for preparation of the uplink shared data channel; and
dropping the uplink shared data channel based at least in part on the signaling.

26. The method of claim 1, further comprising:
receiving the signaling after a threshold time for preparation of the uplink shared data channel;
puncturing the uplink shared data channel via the one or more subbands indicated by the signaling; and
transmitting the uplink shared data channel via the subset of subbands excluding the one or more subbands based at least in part on the puncturing.

27. The method of claim 1, wherein:
the LBT procedure of the first type comprises a category 4 LBT procedure; and
the LBT procedure of the second type comprises a category 2 LBT procedure.

28. A method for wireless communications at a base station, comprising:
identifying a subset of subbands supported by the base station in communication with a user equipment (UE);
transmitting an uplink grant for an uplink shared data channel via the subset of subbands in a transmission time interval, the uplink grant indicating a listen before talk (LBT) procedure of a first type for the subset of subbands in the transmission time interval;
performing an LBT procedure for each of the subset of subbands; and
transmitting, after transmitting the uplink grant and within the transmission time interval, signaling that indicates one or more subbands of the subset associated with an LBT procedure of a second type based at least in part on performing the LBT procedure, wherein the LBT procedure of the second type for the one or more subbands is different than the LBT procedure of the first type for each subband of the subset of subbands indicated via the uplink grant.

29. An apparatus for wireless communications at a user equipment (UE), comprising:
means for identifying a subset of subbands supported by a base station in communication with the UE;
means for receiving an uplink grant for transmission of an uplink shared data channel via the subset of subbands in a transmission time interval, the uplink grant indicating a listen before talk (LBT) procedure of a first type for the subset of subbands in the transmission time interval;
means for receiving, after receiving the uplink grant and within the transmission time interval, signaling that indicates one or more subbands of the subset associated with an LBT procedure of a second type, wherein the LBT procedure of the second type for the one or more subbands is different than the LBT procedure of the first type for each subband of the subset of subbands indicated via the uplink grant; and
means for performing LBT procedures of the first type or the second type on the subset of subbands based at least in part on the uplink grant and the signaling.

30. A non-transitory computer-readable medium storing code for wireless communications at a user equipment (UE), the code comprising instructions executable by a processor to:
identify a subset of subbands supported by a base station in communication with the UE;
receive an uplink grant for transmission of an uplink shared data channel via the subset of subbands in a transmission time interval, the uplink grant indicating a listen before talk (LBT) procedure of a first type for the subset of subbands in the transmission time interval;
receive, after receiving the uplink grant and within the transmission time interval, signaling that indicates one or more subbands of the subset associated with an LBT procedure of a second type, wherein the LBT procedure of the second type for the one or more subbands is different than the LBT procedure of the first type for each subband of the subset of subbands indicated via the uplink grant; and
perform LBT procedures of the first type or the second type on the subset of subbands based at least in part on the uplink grant and the signaling.

* * * * *